(12) United States Patent
Lu et al.

(10) Patent No.: US 10,401,517 B2
(45) Date of Patent: Sep. 3, 2019

(54) CROSSTALK ATTENUATION FOR SEISMIC IMAGING

(71) Applicant: PGS Geophysical AS, Oslo (NO)

(72) Inventors: Shaoping Lu, Houston, TX (US); Norman Daniel Whitmore, Jr., Houston, TX (US); Alejandro Antonio Valenciano Mavilio, Houston, TX (US)

(73) Assignee: PGS Geophysical AS, Oslo (NO)

( * ) Notice: Subject to any disclaimer, the term of this patent is extended or adjusted under 35 U.S.C. 154(b) by 334 days.

(21) Appl. No.: 14/991,416

(22) Filed: Jan. 8, 2016

(65) Prior Publication Data

US 2016/0238726 A1   Aug. 18, 2016

Related U.S. Application Data

(60) Provisional application No. 62/116,749, filed on Feb. 16, 2015.

(51) Int. Cl.
| | |
|---|---|
| *G01V 1/36* | (2006.01) |
| *G01V 1/38* | (2006.01) |
| *G01V 1/32* | (2006.01) |
| *G01V 1/34* | (2006.01) |

(52) U.S. Cl.
CPC ............... *G01V 1/36* (2013.01); *G01V 1/32* (2013.01); *G01V 1/345* (2013.01); *G01V 1/38* (2013.01); *G01V 2210/51* (2013.01); *G01V 2210/56* (2013.01)

(58) Field of Classification Search
CPC . G01V 1/36; G01V 1/32; G01V 1/345; G01V 1/38; G01V 2210/51; G01V 2210/56
See application file for complete search history.

(56) References Cited

U.S. PATENT DOCUMENTS

| | | |
|---|---|---|
| 5,608,814 A | 3/1997 | Gilmore et al. |
| 7,039,197 B1 | 5/2006 | Venkatesh et al. |
| 7,117,145 B1 | 10/2006 | Venkatesh et al. |
| 7,171,003 B1 | 1/2007 | Venkatesh et al. |
| 7,995,829 B2 | 8/2011 | Ferro et al. |
| 2004/0081322 A1 | 4/2004 | Schliep et al. |
| 2006/0227902 A1 | 10/2006 | Kaynak et al. |
| 2010/0030830 A1* | 2/2010 | Dokuchaev ............. G06F 17/18 708/300 |
| 2012/0155217 A1* | 6/2012 | Dellinger ............... G01V 1/005 367/38 |
| 2012/0281746 A1* | 11/2012 | Herrmann ................ H04B 3/32 375/229 |
| 2013/0054664 A1 | 2/2013 | Chang et al. |

(Continued)

OTHER PUBLICATIONS

European Search Report for related EP Application No. 16155352.4, dated Jul. 4, 2016 (11 pgs).

(Continued)

*Primary Examiner* — Peter Bradford

(57) ABSTRACT

Crosstalk attenuation for seismic imaging can include creation of a seismic image based on seismic data including multiples. The seismic image can include causal crosstalk and anti-causal crosstalk. Causal crosstalk and anti-causal crosstalk can be predicted based on the seismic data. The predicted causal crosstalk and the predicted anti-causal crosstalk can be attenuated from the seismic image.

16 Claims, 14 Drawing Sheets

(56) References Cited

U.S. PATENT DOCUMENTS

2015/0046093 A1* 2/2015 Pires De Vasconcelos ............... G01V 1/307
702/16

OTHER PUBLICATIONS

Hu, et al., "Migration of Free-Surface-Related Multiples: Removing Artefacts using a water-layer model", Journal of Applied Geophysics. vol. 112 (2015) (10 pgs).
Vyas, et al., "Application of Least-Squares Joint Imaging of Multiples and Primaries to Shallow-water Data", SEG/New Orleans 2006 Annual Meeting (5 pgs).
Lu, et al., "Enhanced Subsurface Illumination From Separated Wavefield Imaging", First Break vol. 32, Nov. 2014 (6 pgs).
Van Groenestijn, et al., "Estimating Primaries by Sparse Inversion and Application to Near-Offset Data Reconstruction", Geophysics, vol. 74, No. 3, (May-Jun. 2009) (6 pgs).
Hegge, et al., "Enhanced 3D Surface Related Multiple Elimination with Dual-Sensor Data", SEG San Antonio 2011 Annual Meeting (5 pgs).
Muijs, et al., "Prestack Depth Migration of Primary and Surface-Related Multiple Reflections: Part II—Identification and Removal of Residual Multiples", Geophysics, vol. 72, No. 2, (Mar.-Apr. 2007) (6 pgs).
Whitmore, et al., "Imaging of Primaries and Multiples with Image Space Surface Related Multiple Elimination", 73rd EAGE Conference & Exhibition Incorporating SPE EUROPEC 2011, Vienna, Austria, May 23-26, 2011 (5 pgs).
Artman, B., G. Alvarez, K. Matson, 2007, Image space surface-related multiple prediction: Geophysics, 72,S113-S122.

Claerbout, J. F., 1971, Toward a unified theory of reflector mapping: Geophysics, 36, 467-481.
Verschuur, D.J., A. Berkout, 2011,Seismic migration of blended shot records with surface-related scattering: Geophysics, 76, No. 1, A7-A13.
Carlson, D., A. Long, W. Söllner, H. Tabti, R. Tenghamn, and N. Lunde, 2007, Increased resolution and penetration from a towed dual-sensor streamer: First Break, 25, 71-77.
Guitton, A., 2002, Shot-profile migration of multiple reflections: 72nd Annual International Meeting,SEG, Expanded Abstract, 1296-1299.
Muijs, R., J. O. A. Robertsson, and K. Holliger, 2007, Prestack depth migration of primary and surface related multiple reflections: Part I—Imaging: Geophysics, 72, No. 2, S59-S69.
Rickett, J., P. Sava, 2002, Offset and angle-domain common image-point gathers for shot-profile migration, Geophysics, v. 67, No. 3, pp. 883-889.
Van Borselen, R. G., Fokkema, J. T., and van den Berg, P. M.,1996, Surface-related multiple elimination: Geophysics, 61, 202-210.
Verschuur, D.J. [1991] Surface-related multiple elimination, an inversion approach. Ph.D. Dissertation, Delft University of Technology.
Whitmore, N. D., A. Valenciano, W Söllner. , S. Lu, 2010,Imaging of primaries and multiples using a dual-sensor towed streamer, 80th Annual International Meeting, SEG, Expanded Abstract, 29, 3187-3192.
Mexican Office Action for related Mexican Application No. MX/A/2016/002046, dated Aug. 28, 2018 (Translation & Original Copy) (6 pages total).
2nd Mexican Office Action for related Mexican Application No. MX/A/2016/002046, dated Feb. 5, 2019 (Translation & Original Copy) (14 total).

* cited by examiner

CROSSTALK ATTENUATION FOR SEISMIC IMAGING

CROSS-REFERENCE TO RELATED APPLICATIONS

This application claims priority to U.S. Provisional Application No. 62/116,749, filed Feb. 16, 2015, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine survey vessel tows one or more seismic sources below the sea surface of the water and over a subterranean formation to be surveyed for mineral deposits. Seismic receivers may be located on or near the seafloor, on one or more streamers towed by the marine survey vessel, or on one or more streamers towed by another vessel. The marine survey vessel typically contains marine seismic survey equipment, such as navigation control, seismic source control, seismic receiver control, and recording equipment. The seismic source control may cause the one or more seismic sources, which can be air guns, marine vibrators, etc., to produce acoustic signals at selected times. Each acoustic signal is essentially a sound wavefield that travels down through the water and into the subterranean formation. At each interface between different types of rock, a portion of the wavefield may be refracted, and another portion may be reflected, which may include some scattering, back toward the body of water to propagate toward the sea surface. The seismic receivers thereby measure a wavefield that was initiated by the actuation of the seismic source.

DETAILED DESCRIPTION

Figure 1:
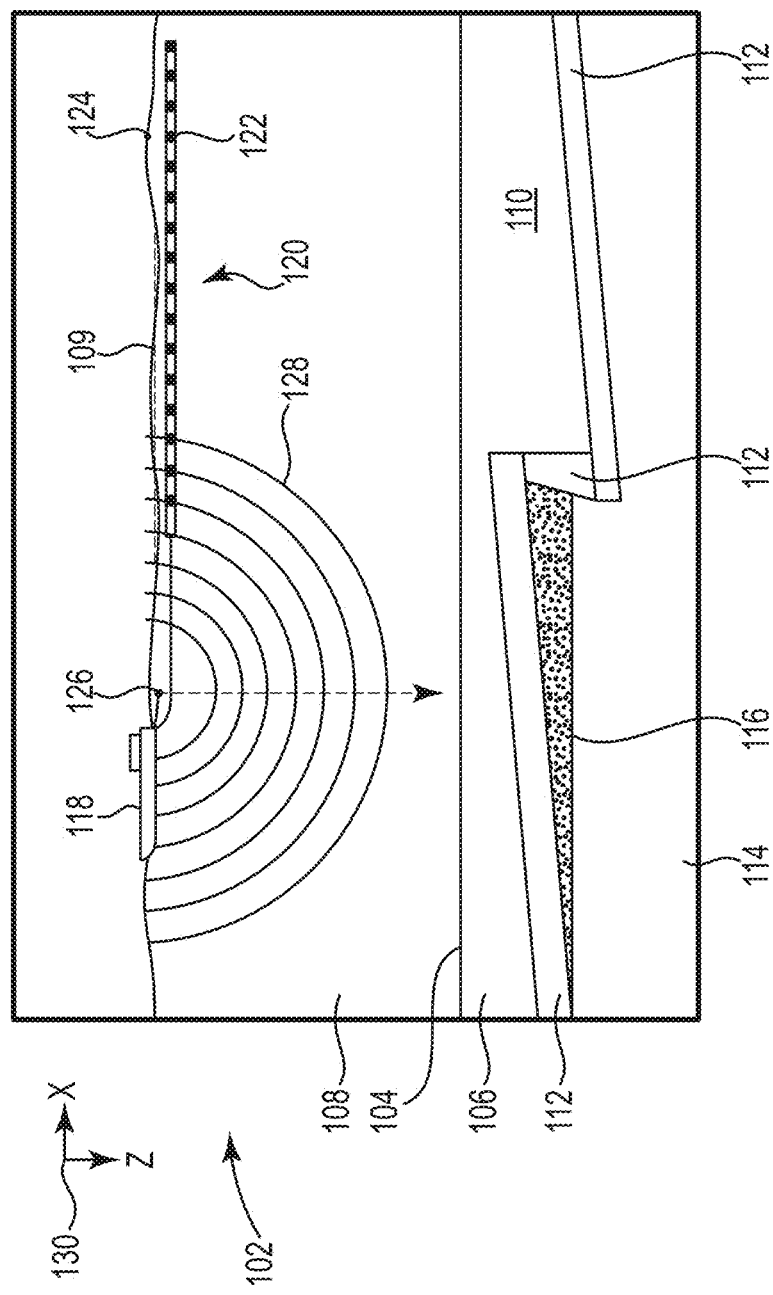
FIG. 1 illustrates an elevation or xz-plane view of marine seismic surveying in which acoustic signals are emitted by a seismic source for recording by seismic receivers for processing and analysis in order to help characterize the structures and distributions of features and materials underlying the surface of the earth.

The present disclosure is related to crosstalk attenuation for seismic imaging. A seismic source can emit an acoustic signal. Examples of seismic sources include air guns and marine vibrators, among others. Pressure and particle motion variation as a function of time and position caused by an acoustic signal from a seismic source or modeled as being emitted by a modeled seismic source is called the "source wavefield." One or more seismic sources can be modeled as a point source. Pressure and particle motion variation as a function of time and position measured by a seismic receiver or modeled as being received by a modeled seismic receiver is called the "receiver wavefield."

Goals of seismic processing can include mathematically transforming recorded reflections into seismic images of the earth's subsurface. For example, seismic processing methods can include mathematically simulating wavefield propagation using a computer, where boundary data from a sea surface can be extrapolated into a model of the subsurface. As used herein, propagation is the movement of a wavefield, extrapolation is a simulation of propagation, and migration is a process by which an image is produced through extrapolation of boundary data in space and/or time to another location, such as the subsurface, to produce a seismic image. The boundary data at the sea surface can consist of two parts: a source wavefield, and a receiver wavefield. Some wave equation seismic imaging methods can include extrapolating source and receiver wavefields from the sea surface into an earth model (e.g., subsurface model) and can produce a seismic image by computing the locations where a source wavefield and a receiver wavefield are in phase.

Primary wavefields ("primaries") and multiple wavefields ("multiples") can each be divided into down-going and up-going primaries and multiples respectively. As used herein, a down-going primary is a wavefield that is a reflection of an up-going primary. An up-going primary is a reflection of a wavefield emitted by a seismic source. A down-going multiple is a reflection of an up-going multiple. An up-going multiple is a reflection of a down-going primary or multiple. Some seismic imaging methods only make use of primaries. However, multiples can carry valuable information. According to the present disclosure, it can be beneficial to incorporate multiples in seismic imaging methods. However, correlation based seismic imaging with multiples can generate crosstalk. Crosstalk can be generated by source and receiver wavefields being in phase at locations that are not the same location as a subsurface reflector. Attenuation of crosstalk can be achieved by post-processing the seismic image and/or modifying the seismic image conditions. As described in more detail with respect to FIG. 4, causal crosstalk is a false indication of an up-going wavefield being in phase with a down-going wavefield. The false indication can correspond to a location that is deeper than a location where two different wavefields are actually in phase. The false indication can correspond to a time that is later than a time when two different wavefields are actually in phase. As described in more detail with respect to FIG. 5, anti-causal crosstalk is a false indication of an up-going wavefield being in phase with a down-going wavefield that corresponds to a location that is shallower and/or a time that is earlier than a location and/or time where and/or where two different wavefields are actually in phase.

Migration using primaries and multiples can include creating different seismic images by supplying different wavefields as source wavefields and/or receiver wavefields. An example of creating different seismic images by supplying different source and/or receiver wavefields is provided in Table 1. Table 1 lists corresponding seismic images from migration (Image 1 to Image 18). Image 19, Image 20, and Image 21 are created from post-processing combined Images 1-18. Image 19 is a seismic image of multiples after causal crosstalk and anti-causal crosstalk attenuation. Image 20 is a combined seismic image of primaries and multiples after causal crosstalk and anti-causal crosstalk attenuation. Image 21 is a joint seismic image of primaries and multiples after causal crosstalk and anti-causal crosstalk attenuation. Migration can use seismic data, such as source and receiver wavefields, as inputs to create a seismic image of a subsurface reflector. The seismic data may be acquisition data. Crosstalk can be predicted without first creating a seismic image that includes the crosstalk. If the source and receiver wavefields are the same (e.g., if the source and receiver wavefields are primaries, or if the source and receiver wavefields are first order multiple, etc.), the migration can output crosstalk. This type of crosstalk is categorized as zeroth ($0^{th}$) order crosstalk. Other orders of crosstalk are described herein.

TABLE 1

Source wavefields, receiver wavefields, and seismic images from combination of different source receiver wavefield pairs.

| | Receiver | | |
|---|---|---|---|
| Source | Primaries (Receiver A) | Multiples (Receiver B) | Primaries + Multiples (Receiver C) |
| | Image | | |
| Point Source [for Direct Arrival] (Source A) | Primaries (Image 1) | Causal Crosstalk (Image 2) | Primaries + Causal Crosstalk (Image 3) |
| Primaries (Source B) | Anti-causal Crosstalk (only $0^{th}$ order) (Image 4) | Multiples + Causal Crosstalk (Image 5) | Multiples + Causal Crosstalk + Anti-causal Crosstalk (only $0^{th}$ order) (Image 6) |
| Multiples (Source C) | Anti-causal Crosstalk (except for $0^{th}$ order) (Image 7) | Multiples + Causal Crosstalk + Anti-causal Crosstalk (Image 8) | Multiples + Causal Crosstalk + Anti-causal Crosstalk (Image 9) |
| Primaries + Multiples (Source D) | Anti-causal Crosstalk (Image 10) | Multiples + Causal Crosstalk + Anti-causal Crosstalk (Image 11) | Multiples + Causal Crosstalk + Anti-causal Crosstalk (Image 12) |
| Point Source + Primaries + Multiples (Source E) | Primaries + Anti-causal Crosstalk (Image 13) | Multiples + Causal Crosstalk + Anti-causal Crosstalk (Image 14) | Primaries + Multiples + Causal Crosstalk + Anti-causal Crosstalk (Image 15) |
| Point Source + Primaries (Source F) | Primaries + Anti-causal Crosstalk (only $0^{th}$ order) (Image 16) | Multiples + Causal Crosstalk (Image 17) | Primaries + Multiples + Causal Crosstalk + Anti-causal Crosstalk (only $0^{th}$ order) (Image 18) |

TABLE 2

Terminology versus symbol of variables and operators

| Symbol | Object (variable and operator) |
|---|---|
| $P_U$ | Up-going wavefield |
| $P_U^p$ | Up-going primary |
| $P_U^{m1}$ | $1^{st}$ order up-going multiple |
| $P_U^{m2}$ | $2^{nd}$ order up-going multiple |
| $P_D$ | Down-going wavefield |
| $P_D^1$ | Down-going wavefield from a point source or down-going wavefield from impulse wavelet |
| $P_D^p$ | Down-going primary |
| $P_D^{m1}$ | $1^{st}$ order down-going multiple |
| $P_D^{m2}$ | $2^{nd}$ order down-going multiple |
| $I(x)$ | Migrated image |
| $G^*(x, x_s)$ | Green's function from the source location ($x_s$) to the subsurface location (x) |
| $G(x, x_r)$ | Green's function from the receiver location ($x_r$) to the subsurface location (x) |
| $G^*(x_r, x)$ | Green's function from the subsurface location (x) to the receiver location ($x_r$) |
| $R(x)$ | Reflectivity |
| x | Subsurface location (vector) |
| $x_s$ | Source location (vector) |

TABLE 2-continued

Terminology versus symbol of variables and operators

| Symbol | Object (variable and operator) |
|---|---|
| $x_r$ | Receiver location (vector) |
| $\omega$ | Temporal frequency |

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 109 may reference element "09" in FIG. 1, and a similar element may be referenced as 209 in FIG. 2. As will be appreciated, elements shown herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine seismic surveying in which acoustic signals are emitted by a seismic source 126 for recording by seismic receivers 122 for processing and analysis in order to help characterize the structures and distributions of features and materials underlying the surface of the earth. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine seismic surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which seismic receivers may be coupled. In one type of marine seismic survey, each seismic receiver, such as the seismic receiver 122 represented by the shaded disk in FIG. 1, comprises a pair of seismic sensors including a geophone that detects particle displacement within the water by detecting particle motion variation, such as velocities or accelerations, and/or a hydrophone that detects variations in pressure. The streamers 120 and the marine survey vessel 118 can include sensing electronics and data-processing facilities that allow seismic receiver readings to be correlated with absolute positions on the sea surface and absolute three-dimensional positions with respect to a three-dimensional coordinate system. In FIG. 1, the seismic receivers along the streamers are shown to lie below the sea surface 109, with the seismic receiver positions correlated with overlying surface positions, such as a surface position 124 correlated with the position of seismic receiver 122. The marine survey vessel 118 can also tow one or more seismic sources 126 that produce acoustic signals as the marine survey vessel 118 and streamers 120 move across the sea surface 109. Seismic sources 126 and/or streamers 120 may also be towed by other vessels, or may be otherwise disposed in fluid volume 108. For example, seismic receivers may be located on ocean bottom cables or nodes fixed at or near the surface 104, and seismic sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to receivers located on a towed streamer, an ocean bottom seismic receiver cable, and/or an array of nodes.

FIG. 1 shows an expanding, spherical acoustic signal, illustrated as semicircles of increasing radius centered at the seismic source 126, representing a down-going wavefield 128, following an acoustic signal emitted by the seismic source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic acoustic signals within the subsurface volume 106.

Acquisition and processing techniques can be used to extract up-going and down-going wavefields. In a marine setting, dual-sensor (e.g., hydrophone and/or vertical geophone, etc.) and/or down-going and up-going wavefield separation can be used to extract such wavefields. Approximations of up-going and/or down-going wavefields can be determined by other methods of deghosting. Up-going and down-going wavefields can be represented by equation (1) as follows:

$$\left. \begin{array}{l} P_U = P_U^p + P_U^{m1} + P_U^{m2} + \ldots \quad (1.1) \\ P_D = P_D^1 + P_D^p + P_D^{m1} + P_U^{m2} + \ldots \quad (1.2) \end{array} \right\} \quad (1)$$

where $P_U$ represents an up-going wavefield and $P_D$ represents a down-going wavefield. $P_U^p$ represents the primaries of the up-going wavefield, $P_U^{m1}$ represents first order surface multiples of the up-going wavefield, $P_U^{m2}$ represents second order surface multiples of the up-going wavefield, etc. $P_D^1$ represents the down-going wavefield from a point source. $P_D^{m1}$ represents first order surface multiples of the down-going wavefield, $P_D^{m2}$ represents the second order surface multiples of the down-going wavefield, etc.

The components of $P_U$ and $P_D$ are listed in Table 2. In a migration, $P_D$ can be used as an input for a source wavefield, and $P_U$ can be used as an input for a receiver wavefield. When different primary and multiple components in $P_U$ and $P_D$ are combined during migration, different seismic images can be created as shown in Table 1.

Migration using down-going wavefield data as a generalized source wavefield and up-going wavefield data as a generalized receiver wavefield can be represented by Equation 2 as follows:

$$I(x) = \Sigma_\omega \Sigma_{x_s} \Sigma_{x_r} G^*(x, x_s; \omega) P^*_D(x_s, x_r; \omega) G(x_s, x_r; \omega) P_U(x_s, x_r; \omega) \quad (2)$$

where $G(x, x_r; \omega)$ represents the Green's function from a receiver at the surface, $x_r$, to an image point x in a subsurface, $G^*(x, x_s; \omega)$ represents the Green's function from a source at the surface, $x_s$, to an image point x in a subsurface, and $P_U$ represents and up-going wavefield and $P_D$ represents a down-going wavefield.

A receiver wavefield can be simulated given a source wavefield and a subsurface reflection property (e.g., velocity, reflectivity, impedance, etc.). A one-way finite difference operator can be used to migrate a wavefield in the frequency domain. Embodiments are not, however, limited to a one-way wave equation operator. For example, a two-way wave equation or any ray based operator can be used.

Numerical modeling can include using a down-going wavefield as the source wavefield. Simulated up-going wavefield data at receivers can be represented by Equation 3 as follows:

$$P_U(x_r; \omega) = G^*(x, x_s; \omega) P^*_D(x_s; \omega) R(x) G^*(x_r, x; \omega) \quad (3)$$

where $G^*(x, x_s; \omega)$ represents the Green's function from the source location $(x_s)$ to the sea surface reflection point (x), $G^*(x_r, x; \omega)$ is the Green's function from the subsurface reflection point (x) to the receiver location $(x_r)$, $P^*_D(x_s; \omega)$ is the down-going wavefield used as a source wavefield at the sea surface location $(x_s)$, $R(x)$ is the reflectivity at the subsurface location (x), and $P_U(x_r; \omega)$ is the simulated up-going wavefield at the receiver location $(x_r)$.

Figure 2:
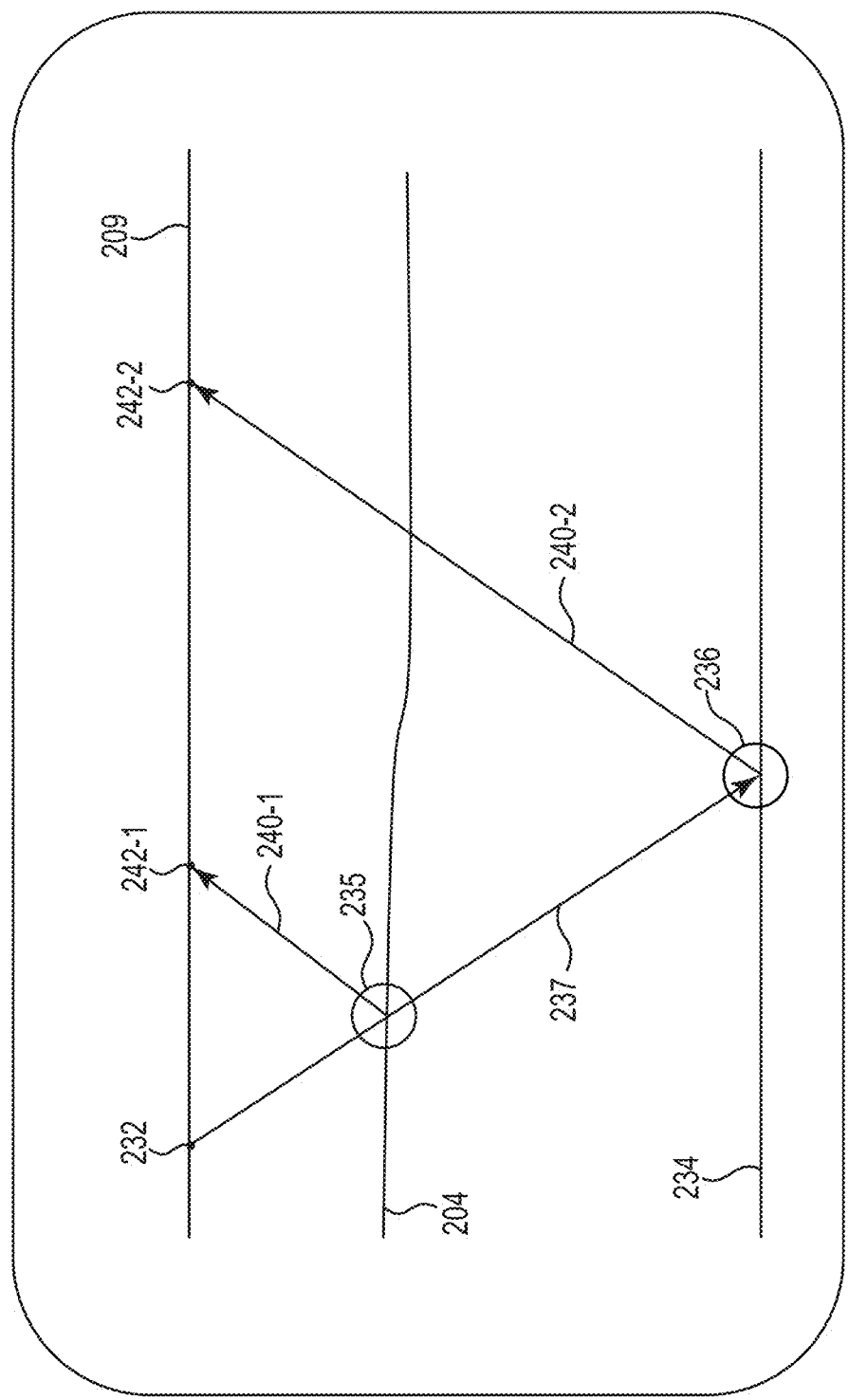
FIG. 2 illustrates an elevation or plane view of a state representing marine seismic imaging including primaries represented as rays.

FIG. 2 illustrates an elevation or plane view of a state representing marine seismic imaging including primaries represented as rays. The state includes a sea surface 209, a surface 204 underlying the sea surface 209, and a subsurface reflector 234 underlying the surface 204. Although only one subsurface reflector 234 is illustrated for ease of explanation and illustration, embodiments can include more than one subsurface reflector. By way of example, the subsurface reflector 234 can be associated with a hydrocarbon saturated layer that is the target of seismic imaging.

A point source 232 is illustrated emitting a down-going point source wavefield 237, which is illustrated as a ray. The down-going point source wavefield 237 is illustrated reflecting off of the surface 204 as a first up-going primary 240-1. The point where the down-going point source wavefield 237 and the first up-going primary 240-1 are in phase is referred to as a surface image point 235 because it is an image point at the surface 204. Wave equation seismic imaging methods can migrate down-going and up-going wavefields to produce a seismic image where these wavefields are in phase. The first up-going primary 240-1 continues up to the sea surface 209 where it can be recorded by a first seismic receiver 242-1.

The down-going point source wavefield 237 is illustrated as continuing through the surface 204 to a subsurface reflector 234, where it reflects as a second up-going primary 240-2. The point where the down-going point source wavefield 237 and the second up-going primary 240-2 are in phase is referred to as a subsurface image point 236 because it is an image point at the subsurface reflector 234. The second up-going primary 240-2 continues up to the sea surface 209 where it can be recorded by a second seismic receiver 242-2. Although the point source 232, the first seismic receiver 242-1, and the second seismic receiver 242-2 are illustrated at or near the sea surface 209 for clarity, as will be appreciated by one of ordinary skill in the art, they can be below the sea surface 209.

Figure 3:
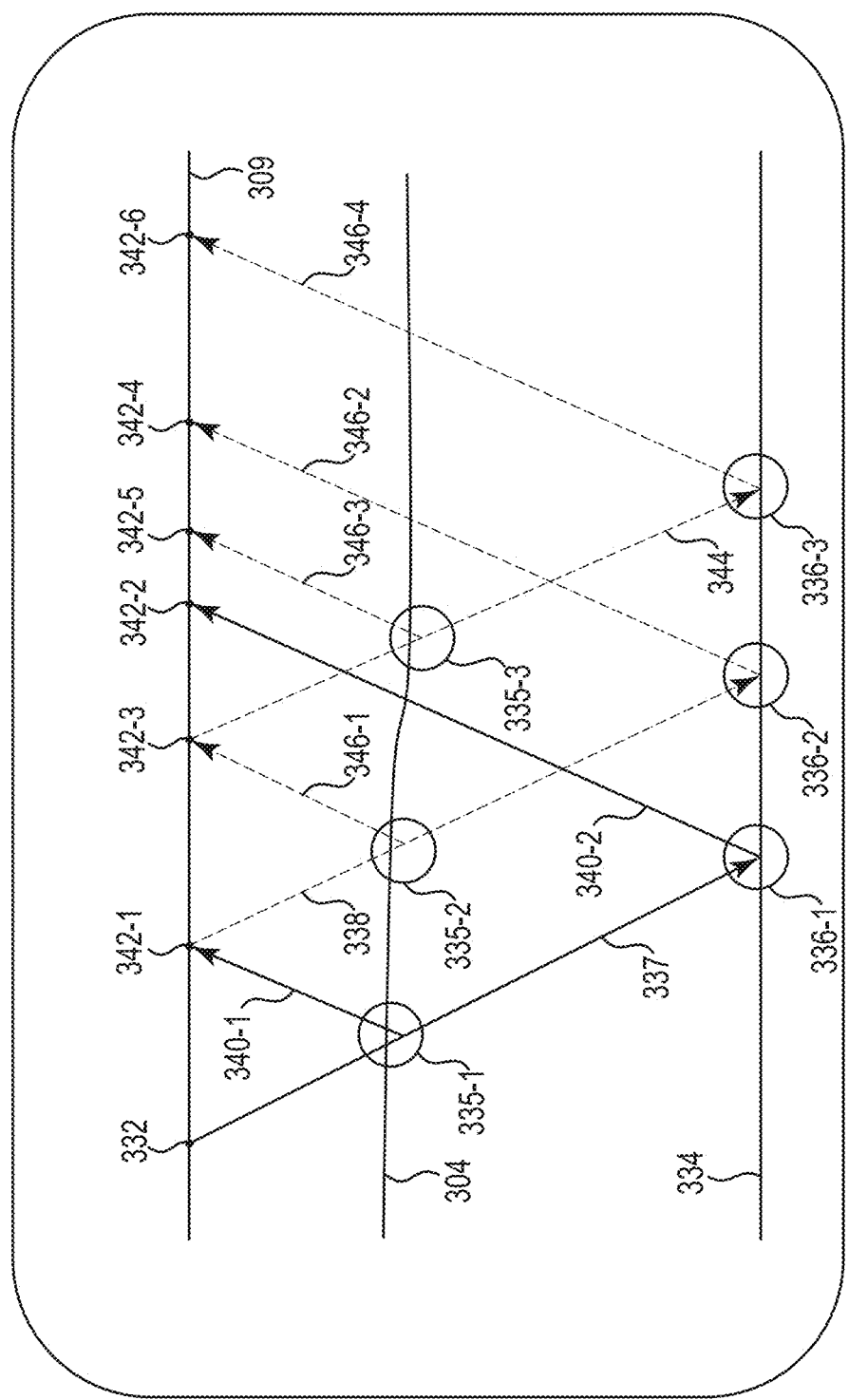
FIG. 3 illustrates an elevation or plane view of a state representing marine seismic imaging including primaries and multiples represented as rays.

FIG. 3 illustrates an elevation or plane view of a state representing marine seismic imaging including primaries and multiples represented as rays. The state includes a sea surface 309, a surface 304 underlying the sea surface 309, a subsurface reflector 334 underlying the surface 304, a point source 332, a down-going point source wavefield 337, a first up-going primary 340-1, a second up-going primary 340-2, a first surface image point 335-1, a first subsurface image point 336-1, a first seismic receiver 342-1, and a second seismic receiver 342-2.

As illustrated in FIG. 3, the first up-going primary 340-1 reflects off of the sea surface 309 at a location coincident with the first seismic receiver 342-1 and continues down as a down-going primary 338.

The down-going primary 338 is illustrated reflecting off of the surface 304 as a first up-going multiple 346-1. The first up-going multiple 346-1 is a first order multiple because it is an up-going reflection of a primary. The down-going primary 338 and the first up-going multiple 346-1 are in phase at a second surface image point 335-2. The down-going primary 338 is also illustrated reflecting off of the subsurface reflector 334 as a second up-going multiple 346-2, which is also a first order up-going multiple. The down-going primary 338 and the second up-going multiple 346-2 are in phase at a second subsurface image point 336-2. The second up-going multiple 346-2 is illustrated reaching the sea surface 309 at a location coincident with a location of a fourth seismic receiver 342-4.

The first up-going multiple 346-1 is illustrated reflecting off of the sea surface 309 at a location coincident with a location of a third seismic receiver 342-3 as a down-going multiple 344. The down-going multiple 344 is a first order down-going multiple because it is a down-going reflection of a first order multiple.

The down-going multiple 344 is illustrated reflecting off of the surface 304 as a third up-going multiple 346-3. The third up-going multiple 346-3 is a second order multiple because it is an up-going reflection of a first order multiple. The down-going multiple 344 and the third up-going multiple 346-3 are in phase at a third surface image point 335-3. The third up-going multiple 346-3 is illustrated reaching the sea surface 309 at a location coincident with a location of a fifth seismic receiver 342-5. The down-going multiple 344 is also illustrated reflecting off of the subsurface reflector 334 as a fourth up-going multiple 346-4, which is also a second order up-going multiple. The down-going multiple 344 and the fourth up-going multiple 346-4 are in phase at a third subsurface image point 336-3. The fourth up-going multiple is illustrated reaching the sea surface 309 at a location coincident with a location of a sixth seismic receiver 342-6.

As opposed to primaries, which may be generally transformed into desired seismic image data, multiples may be generally undesired seismic data because they do not transform into desired seismic image data, but may be generally considered to transform into noise. Thus, some previous approaches make use only of primaries. However, multiples can carry valuable information and can be used, according to the present disclosure, in seismic imaging methods as described herein. Thus, while some previous approaches to seismic imaging may seek to remove multiples, at least one embodiment of the present disclosure retains the information provided by the multiples without removing the multiples or before removing the multiples from the seismic data. However, correlation based seismic imaging with multiples can generate significant crosstalk, such as causal crosstalk and/or anti-causal crosstalk. Such crosstalk can be generated by down-going and up-going wavefields being in phase at locations that do not correspond to geological reflectors. At least one embodiment of the present disclosure reduces such crosstalk.

Figure 4:
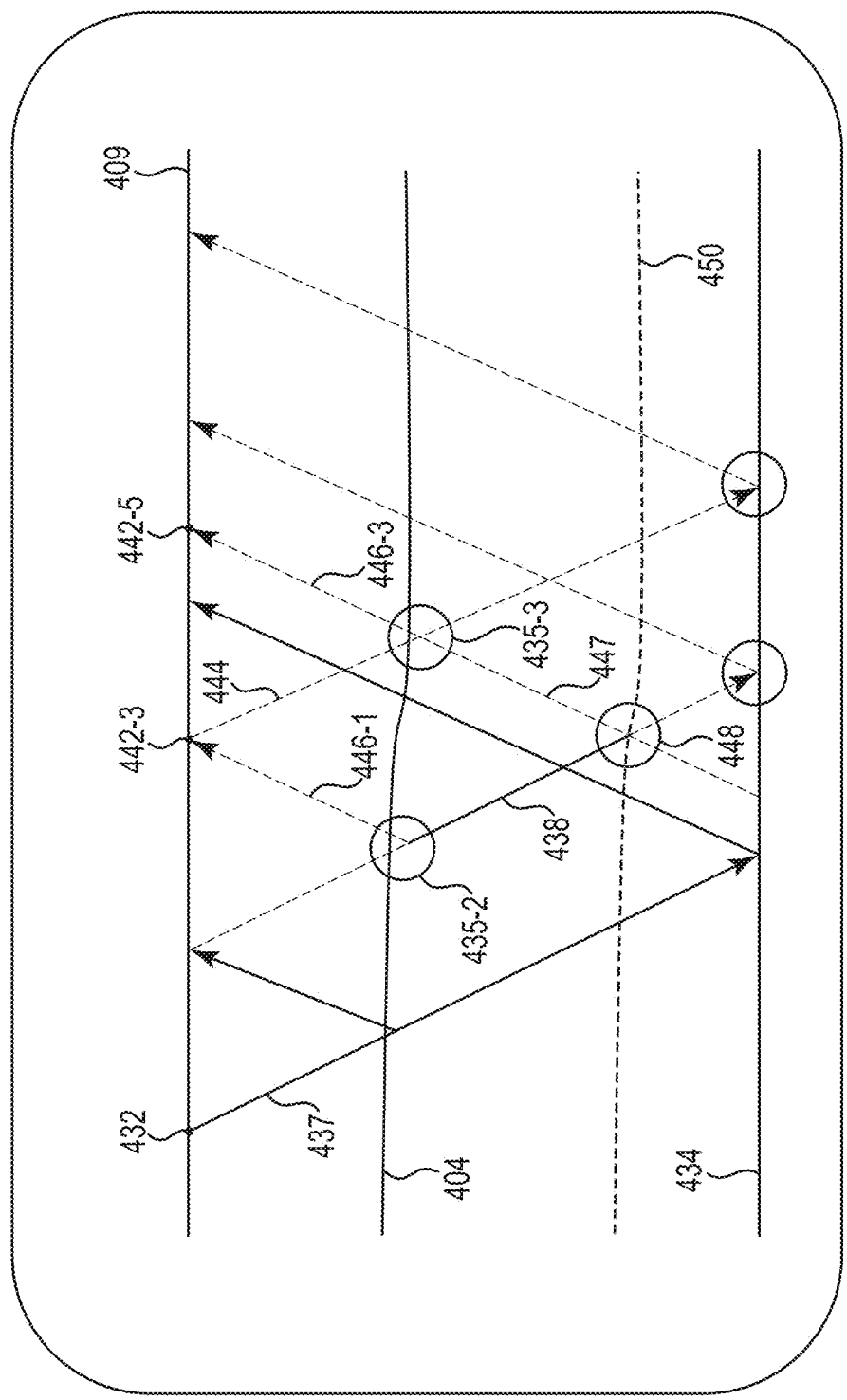
FIG. 4 illustrates an elevation or plane view of a state representing marine seismic imaging including primaries and multiples represented as rays and including causal crosstalk.

FIG. 4 illustrates an elevation or plane view of a state representing marine seismic imaging including primaries and multiples represented as rays and including causal crosstalk 448. The state includes a sea surface 409, a surface 404, a subsurface reflector 434, a seismic source 432, a down-going point source wavefield 437, a third seismic receiver 442-3, a fifth seismic receiver 442-5, a down-going primary 438, a down-going multiple 444, a first up-going multiple 446-1, a third up-going multiple 446-3, a second surface image point 435-2, and a third surface image point 435-3.

Causal crosstalk 448 is a false indication of an up-going wavefield being in phase with a down-going wavefield. The false indication can correspond to a location that is deeper than a location where two different wavefields are actually in phase. The false indication can correspond to a time that is later than a time when two different wavefields are actually in phase. The causal crosstalk 448 appears to indicate that the down-going primary 438 is in phase with the apparent up-going multiple 447 at the false reflector 450. However, in this example, neither the false reflector 450, nor the apparent up-going multiple 447 actually exist. The fact that the down-going primary 438 happens to have a point where it is in phase with an extension of the third up-going multiple 446-3 can generate undesired seismic image data (causal crosstalk 448) for a reflector that does not actually exist (the false reflector 450). This causal crosstalk 448 can appear as noise in a seismic image. The causal crosstalk 448 can be said to correspond to a location that is deeper than a location where two different wavefields are actually in phase because it can be defined by its down-going component, which is the down-going primary 438. The causal crosstalk 448 can be said to correspond to a time that is later than a time where two different wavefields are actually in phase because it can be defined by its down-going component, which is the down-going primary 438. The down-going component (which is also the existing component) of the causal crosstalk 448 (as opposed to the apparent up-going multiple 447) is in phase with the existing first up-going multiple 446-1 at the second surface image point 435-2, which is shallower and earlier than the causal crosstalk 448.

Although not specifically illustrated as such, FIG. 4 can include other examples of causal crosstalk. For example, the first up-going multiple 446-1 can be extended down to be in phase with the down-going point source wavefield 437. The prediction of causal crosstalk illustrated and described with respect to FIG. 6 addresses this other example of causal crosstalk.

In a migration, when the seismic source 432 is modeled as a point source that emits a source wavefield, the down-going source (Source A in Table 1) wavefield, and recorded up-going primaries and multiples (Receiver C in Table 1) are used as a receiver wavefield, a seismic image of primaries can be created with causal crosstalk. An example of a created seismic image with causal crosstalk is illustrated in Table 1 as Image 3.

The up-going and down-going wavefields can be decomposed according to Equation 4 as follows:

$$\left.\begin{array}{ll} P_U = P_U^p + P_U^{m1} + P_U^{m2} + \ldots & (4.1) \\ P_D = P_D^1 & (4.2) \end{array}\right\} \quad (4)$$

where $P_D^1$ represents the down-going wavefield from a point source, $P_U^p$ represents the up-going primaries, $P_U^{m1}$ represents the first order up-going multiples, $P_U^{m2}$ represents the second order up-going multiples, etc., and the components of $P_U$ and $P_D$ are listed in Table 2.

By substituting Equation 4 into Equation 2, the created seismic image (Image 3 in Table 1) can include primaries and causal crosstalk, and can be represented by Equation 5 as follows:

$$\left.\begin{array}{ll} I(x) = \Sigma_\omega \Sigma_{x_s} \Sigma_{x_r} G^*(x, x_s; \omega) P_D^{1*}(x_s, x_r; \omega) & (5.1) \\ \quad G(x, x_r; \omega) P_U^p(x_s, x_r; \omega) + & \\ \Sigma_\omega \Sigma_{x_s} \Sigma_{x_r} G^*(x, x_s; \omega) P_D^{1*}(x_s, x_r; \omega) & (5.2) \\ \quad G(x, x_r; \omega) P_U^{m1}(x_s, x_r; \omega) + & \\ \Sigma_\omega \Sigma_{x_s} \Sigma_{x_r} G^*(x, x_s; \omega) P_D^{1*}(x_s, x_r; \omega) & (5.3) \\ \quad G(x, x_r; \omega) P_U^{m2}(x_s, x_r; \omega) + \ldots & \end{array}\right\} \quad (5)$$

where Equation 5.1 describes a seismic image of primaries, Equation 5.2 describes first order causal crosstalk, and Equation 5.3 describes second order causal crosstalk.

A data domain of the up-going multiples (Receiver B in Table 1) can be modeled using down-going primaries and multiples (Source D in Table 1) as a source wavefield. The seismic image from primaries with causal crosstalk (Image 3 in Table 1) can be used for a subsurface reflection property. A seismic imaging engine (e.g., seismic imaging engine 1376 illustrated in FIG. 13) can use one-way wave equation modeling, however embodiments are not so limited. The down-going wavefield can be represented by Equation 6 as follows:

$$P_D = P_D^p + P_D^{m1} + P_D^{m2} + \ldots \quad (6)$$

where $P_D^p$ represents down-going primaries, $P_D^{m1}$ represents the first order down-going multiples, $P_D^{m2}$ represents the second order down-going multiples, etc., and the components of $P_U$ and $P_D$ are listed in Table 2. Down-going wavefields can be extracted from acquisition and/or processing. In a marine setting this can be achieved using a combination of dual-sensors, for example, a combination of hydrophones and/or vertical geophones, and down-going and up-going wavefield separation. Embodiments are not so limited, however, and other methods of deghosting can be used.

Substituting Equation 5 and Equation 6, the arrival time of a multiple reflection event can be estimated as represented by Equation 7 as follows:

$$P_U(x_r; \omega) = G^*(x, x_s; \omega)P_D^{p*}(x_s; \omega)I(x)G^*(x_r, x; \omega) + \quad (7.1)$$
$$G^*(x, x_s; \omega)P_D^{m1*}(x_s; \omega)I(x)G^*(x_r, x; \omega) + \quad (7.2)$$
$$G^*(x, x_s; \omega)P_D^{m2*}(x_s; \omega)I(x)G^*(x_r, x; \omega) + \ldots + \quad (7.3)$$
$$= P_U^{m1} + P_U^{m2} + P_U^{m3} + \ldots + \quad (7.4)$$
$$P_U^{m2} + P_U^{m3} + \ldots + \quad (7.5)$$
$$P_U^{m3} + \ldots \quad (7.6)$$
$$= P_U^{m1} + 2P_U^{m2} + 3P_U^{m3} + \ldots \quad (7.7)$$

(7)

The modeling of up-going wavefield $P_U$ can include all orders of multiples. However embodiments are not limited to including all orders of multiples. Although the amplitude of modeled multiples can be different from recorded multiples, the arrival and timing of the modeled events can be identical to those from seismic acquisition. In at least one embodiment, the up-going multiples are estimated in the data domain directly, for example using surface related multiple elimination, which removes surface related multiples without using additional information about the subsurface.

The up-going multiples (Receiver B in Table 1) can be removed from the recorded data to generate data representing the primaries. For example, up-going multiples can be adaptively removed from the recorded data (Receiver C in Table 1), which can consist of both primaries and multiples, to generate the data representing the primaries (Receiver A in Table 1).

A seismic source modeled as a point source (Source A in Table 1) can emit a down-going wavefield, which can be used as a source wavefield. Up-going primaries (Receiver A in Table 1), originating from surface related multiple elimination, can be used as a receiver wavefield. A seismic image of only primaries (Image 1 in Table 1) can be created using the down-going wavefield from a point source as a source wavefield and up-going primaries as a receiver wavefield. The migration input of up-going and down-going wavefields can be decomposed as represented by Equation 8 as follows:

$$P_U = P_U^p \quad (8.1)$$
$$P_D = P_D^1 \quad (8.2)$$

(8)

Equations 8.1 and 8.2 can be substituted into Equation 2 to yield Equation 9 as follows:

$$I(x) = \Sigma_\omega \Sigma_{x_s} \Sigma_{x_r} G^*(x, x_s; \omega) P_D^{1*}(x_s, x_r; \omega) G(x, x_r; \omega) P_U^p(x_s, x_r; \omega) \quad (9)$$

A seismic image from a primaries-only wavefield can be created using Equation 9. For example, Image 1 in Table 1 can be created using Equation 9.

Figure 5:
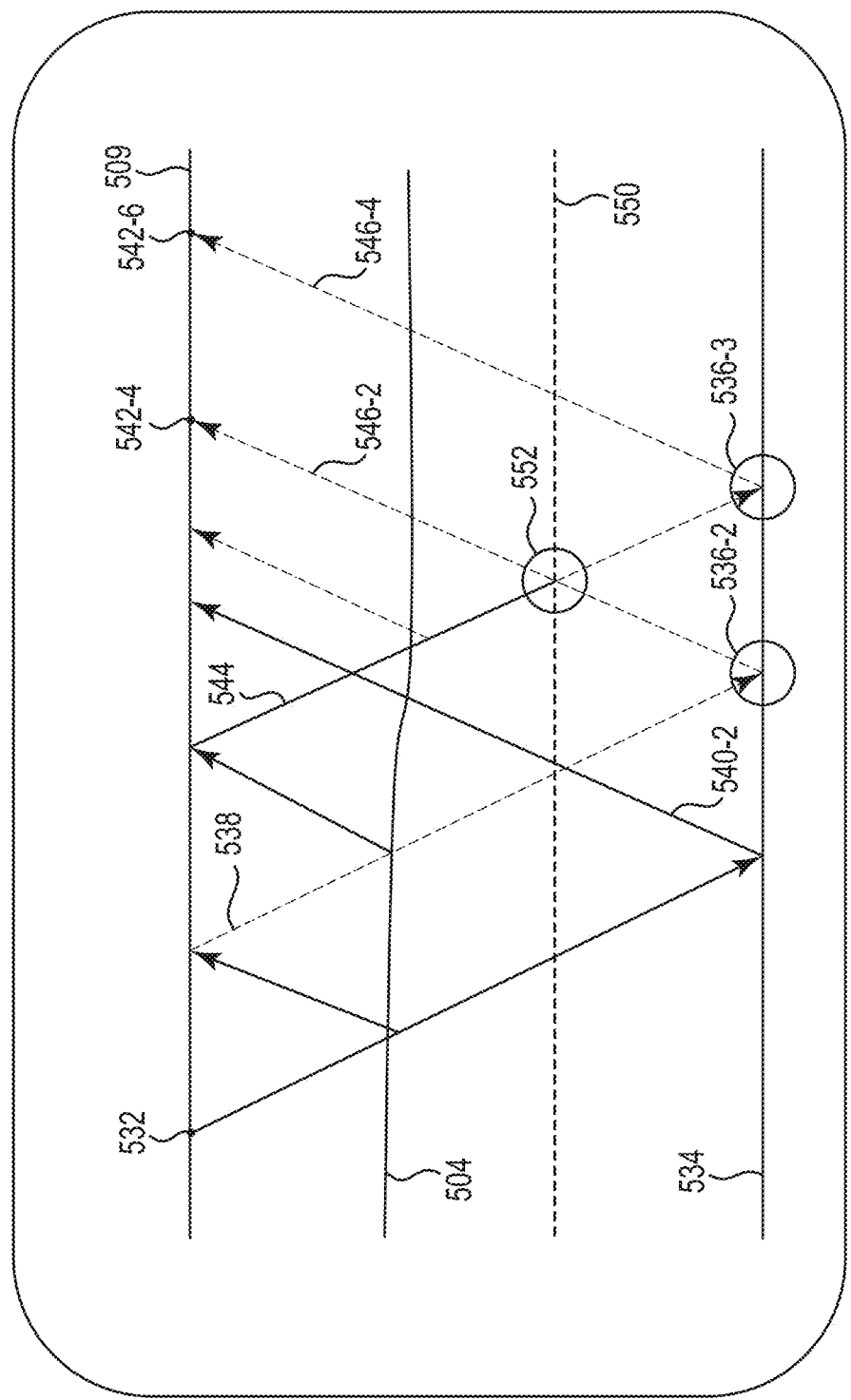
FIG. 5 illustrates an elevation or plane view of a state representing marine seismic imaging including primaries and multiples represented as rays and including anti-causal crosstalk.

FIG. 5 illustrates an elevation or plane view of a state representing marine seismic imaging including primaries and multiples represented as rays and including anti-causal crosstalk 552. The state includes a sea surface 509, a surface 504, a subsurface reflector 534, a seismic source 532, a second up-going primary 540-2, a fourth seismic receiver 542-4, a sixth seismic receiver 542-6, a down-going primary 538, a down-going multiple 544, a second up-going multiple 546-2, a fourth up-going multiple 546-4, a second subsurface image point 536-2, and a third subsurface image point 536-3.

Anti-causal crosstalk 552 is a false indication of an up-going wavefield being in phase with a down-going wavefield that corresponds to a location that is shallower and/or a time that is earlier than a location and/or time where and/or where two different wavefields are actually in phase. The anti-causal crosstalk 552 appears to indicate that the down-going multiple 544 is in phase with the second up-going multiple 546-2 at the false reflector 550. However, the second up-going multiple 546-2 is not a reflection of the down-going multiple 544. Instead, the second up-going multiple 546-2 is a reflection of the down-going primary 538 at the subsurface image point 536-2. The fact that the second up-going multiple 546-2 happens to have a point where it is in phase with the down-going multiple 544 can generate undesired seismic image data (anti-causal crosstalk 552) for a reflector that does not actually exist (the false reflector 550). This anti-causal crosstalk 552 can appear as noise in a seismic image. The anti-causal crosstalk 552 is said to correspond to a location that is shallower and/or a time that is earlier than a location and/or time where and/or where two different wavefields are actually in phase because it can be defined by its down-going component, which is the down-going multiple 544. The down-going component of the anti-causal crosstalk 552 is in phase with the fourth up-going multiple 546-4 at the third subsurface image point 536-3, which is deeper and later than the anti-causal crosstalk 552.

Figure 6:
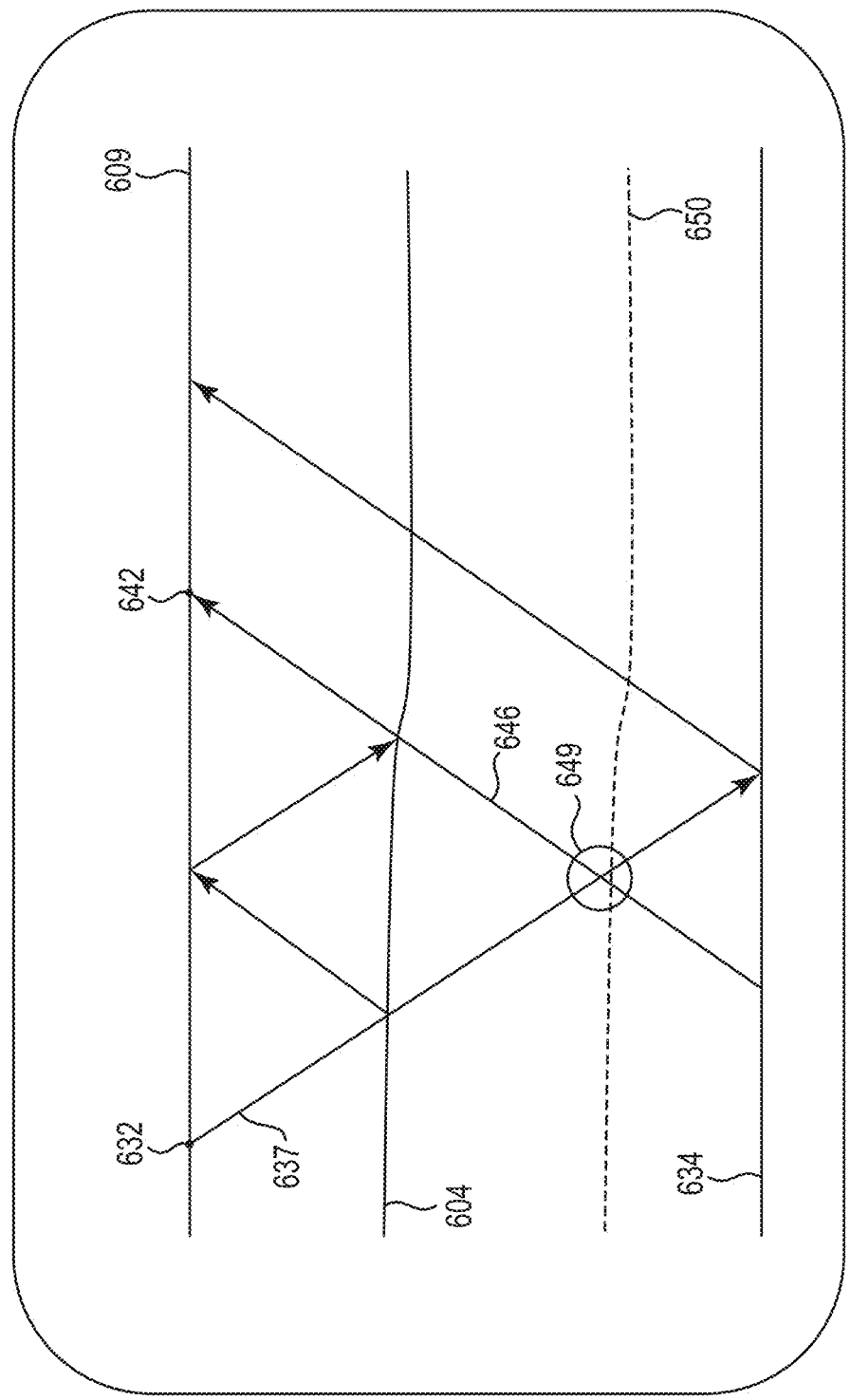
FIG. 6 illustrates an elevation or plane view of a state representing marine seismic imaging for prediction of causal crosstalk.

FIG. 6 illustrates an elevation or plane view of a state representing marine seismic imaging for prediction of causal crosstalk 649. The state includes a sea surface 609, a surface 604, a subsurface reflector 634, a false reflector 650, and a seismic source 632.

In at least one embodiment, for prediction of causal crosstalk, the seismic source 632 is modeled as a point source (Source A in Table 1) that emits the down-going point source wavefield 637. Up-going multiples, such as the up-going multiple 646, which can be received at a seismic receiver 642, can be used as a receiver wavefield (Receiver B in Table 1 by estimation of multiples). Locations where a down-going point source wavefield 637 is in phase with an up-going multiple 646 can constitute a prediction of causal crosstalk 649 (Image 2 in Table 1).

A migration input up-going wavefield and down-going wavefield can be decomposed as:

$$P_U = P_U^{m1} + P_U^{m2} + \ldots \quad (10.1)$$
$$P_D = P_D^1 \quad (10.2)$$

(10)

Equation (10.1) and (10.2) can be substituted into equation (2) to yield equation (11) as follows:

$$I(x) = \Sigma_\omega \Sigma_{x_s} \Sigma_{x_r} G^*(x, x_s; \omega) P_D^{1-}(x_s, x_r; \omega)$$
$$G(x, x_r; \omega) P_U^{m1}(x_s, x_r; \omega) + \quad (11.1)$$
$$\Sigma_\omega \Sigma_{x_s} \Sigma_{x_r} G^*(x, x_s; \omega) P_D^{1*}(x_s, x_r; \omega)$$
$$G(x, x_r; \omega) P_U^{m2}(x_s, x_r; \omega) + \ldots \quad (11.2)$$

(11)

where equation (11.1) represents a first order causal crosstalk and equation (11.2) represents a second order causal crosstalk. In at least one embodiment, all orders of causal crosstalk (Image 2 in Table 1) are be predicted using only one migration.

In at least one embodiment, the causal crosstalk (Image 2 in Table 1) is computed by auto-convolution of the receiver wavefield (Receiver C in Table 1) using, for example, equation (4.1), which consists of both primaries and multiples at the sea surface as represented by equation (12) as follows:

$$I(x) = \Sigma_\omega \Sigma_{x_s} \Sigma_{x_r} G^*(x, x_r; \omega) P_U^p(x_s, x_r; \omega) \quad (12.1)$$
$$G(x, x_r; \omega) P_U^p(x_s, x_r; \omega) +$$
$$\Sigma_\omega \Sigma_{x_s} \Sigma_{x_r} G^*(x, x_r; \omega) P_D^p(x_s, x_r; \omega) \quad (12.2)$$
$$G(x, x_r; \omega) P_U^{m1}(x_s, x_r; \omega) +$$
$$\Sigma_\omega \Sigma_{x_s} \Sigma_{x_r} G^*(x, x_r; \omega) P_D^{m1}(x_s, x_r; \omega) \quad (12.3)$$
$$G(x, x_r; \omega) P_U^p(x_s, x_r; \omega) +$$
$$\Sigma_\omega \Sigma_{x_s} \Sigma_{x_r} G^*(x, x_r; \omega) P_D^{m1}(x_s, x_r; \omega) \quad (12.4)$$
$$G(x, x_r; \omega) P_U^{m1}(x_s, x_r; \omega) + \ldots \quad (12)$$

where equation (12.1) represents a first order causal crosstalk, equation (12.2) represents a second order causal crosstalk, etc.

In the depth domain, the causal crosstalk (Image 2 in Table 1) can be adaptively removed from the seismic image of primaries with causal crosstalk (Image 3 in Table 1) to create a seismic image of only primaries (Image 1). A seismic image of only primaries can be equivalent to a seismic image created using the method described in conjunction with Equation 9.

Figure 7:
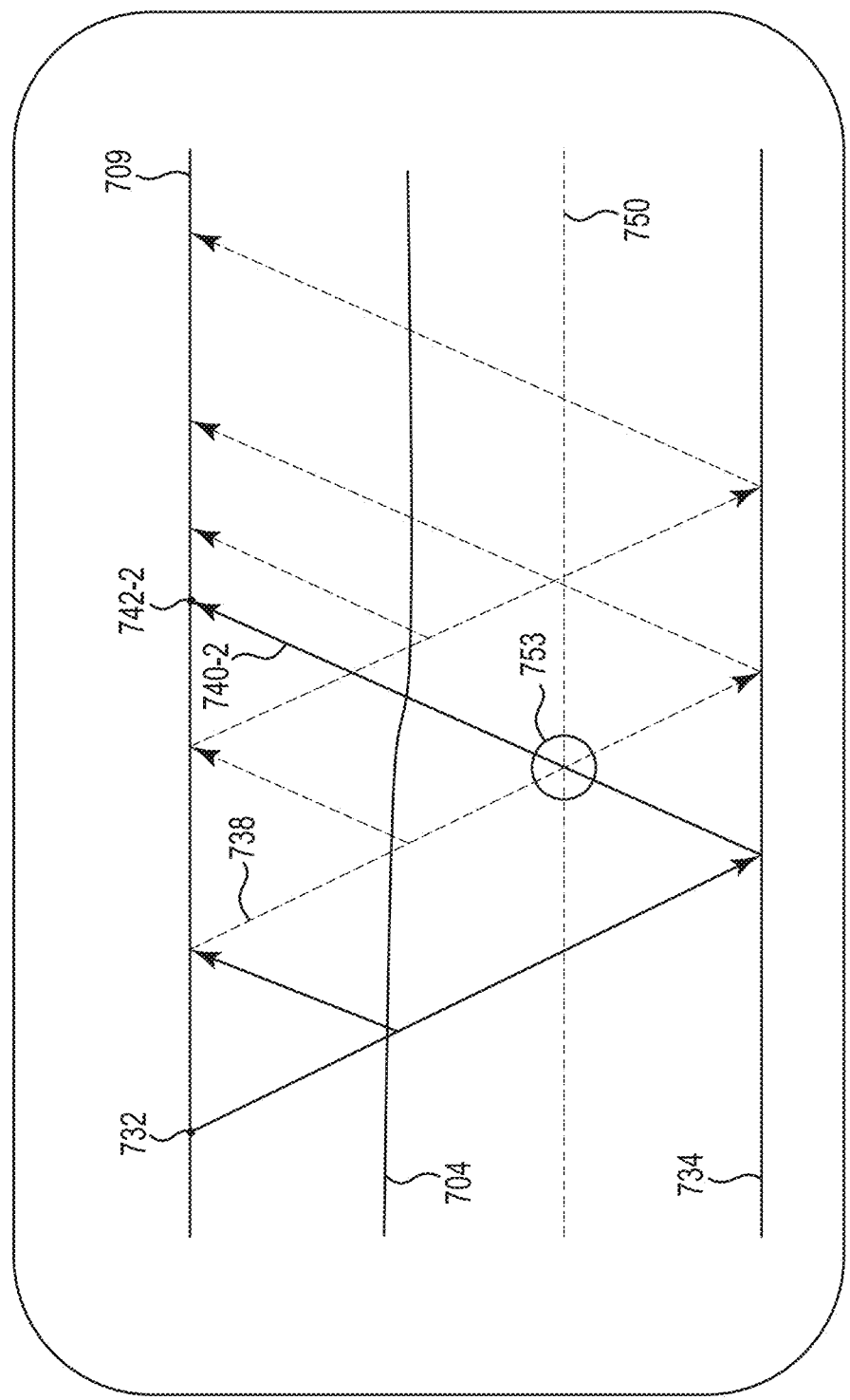
FIG. 7 illustrates an elevation or plane view of a state representing marine seismic imaging including primaries and multiples represented as rays and including a prediction of anti-causal crosstalk.

FIG. 7 illustrates an elevation or plane view of a state representing marine seismic imaging including primaries and multiples represented as rays and including a prediction of anti-causal crosstalk 753. The state includes a sea surface 709, a surface 704, a subsurface reflector 734, a false reflector 750, and a seismic source 732.

At least one embodiment includes seismic imaging of all orders of recorded surface related multiples with causal crosstalk and anti-causal crosstalk, causal crosstalk prediction, anti-causal crosstalk prediction, both causal crosstalk and anti-causal crosstalk attenuation, and combination of a seismic image of primaries and a seismic image of multiples. Down-going primaries and multiples (Source D in Table 1) can be used as a source wavefield and the up-going primaries and multiples (Receiver C in Table 1) can be used as a receiver wavefield to create a seismic image from multiples (Image 12 in Table 1). A seismic image from multiples can include both causal crosstalk and anti-causal crosstalk. As an example, the up-going and down-going wavefields can be decomposed as represented by equation (13) as follows:

$$P_U = P_U^p + P_U^{m1} + \ldots \quad (13.1)$$
$$P_D = P_D^p + P_D^{m1} + \ldots \quad (13.2) \quad (13)$$

Equation 13 can be substituted in Equation 2 to yield Equation 14 as follows:

$$I(x) = \Sigma_\omega \Sigma_{x_s} \Sigma_{x_r} G^*(x, x_s; \omega) P_D^{p*}(x_s, x_r; \omega) \quad (14.1)$$
$$G(x, x_r; \omega) P_U^{m1}(x_s, x_r; \omega) +$$
$$\Sigma_\omega \Sigma_{x_s} \Sigma_{x_r} G^*(x, x_s; \omega) P_D^{m1}(x_s, x_r; \omega) \quad (14.2)$$
$$G(x, x_r; \omega) P_U^{m2}(x_s, x_r; \omega) + \ldots +$$
$$\Sigma_\omega \Sigma_{x_s} \Sigma_{x_r} G^*(x, x_s; \omega) P_D^{p*}(x_s, x_r; \omega) \quad (14.3)$$
$$G(x, x_r; \omega) P_U^{m2}(x_s, x_r; \omega) + \ldots$$
$$\Sigma_\omega \Sigma_{x_s} \Sigma_{x_r} G^*(x, x_s; \omega) P_D^{p*}(x_s, x_r; \omega) \quad (14.4)$$
$$G(x, x_r; \omega) P_U^p(x_s, x_r; \omega) +$$
$$\Sigma_\omega \Sigma_{x_s} \Sigma_{x_r} G^*(x, x_s; \omega) P_D^{m1}(x_s, x_r; \omega) \quad (14.5)$$
$$G(x, x_r; \omega) P_U^p(x_s, x_r; \omega) +$$
$$\Sigma_\omega \Sigma_{x_s} \Sigma_{x_r} G^*(x, x_s; \omega) P_D^{m1}(x_s, x_r; \omega) \quad (14.6)$$
$$G(x, x_r; \omega) P_U^{m1}(x_s, x_r; \omega) + \ldots \quad (14)$$

Different sources of crosstalk that can be present in a seismic image can be identified using Equation 14. Seismic imaging with multiples can be simplified since Equation 13 includes only one order of multiples in the source wavefield and two orders of multiples in the receiver wavefield.

Prediction of causal crosstalk can be performed as described above with respect to FIG. 6. Prediction of anti-causal crosstalk 753 can include the use of down-going multiples (Source D in Table 1), such as the down-going primary 738, as a source wavefield and up-going primaries (Receiver A in Table 1), such as the second up-going primary 740-2, which can be received at the second seismic receiver 742-2, as a receiver wavefield to create a seismic image of anti-causal crosstalk (Image 10 in Table 1), which can be a noise component in the seismic image from multiples (Image 12 in Table 1). The up-going primaries (receiver A in Table 1) can be extracted using data space surface related multiple elimination or using multiples attenuation, as described above in connection with FIG. 6.

Up-going and down-going wavefield migration inputs can be decomposed as represented by Equation 15 as follows:

$$P_U = P_U^p \quad (15.1)$$
$$P_D = P_D^p + P_D^{m1} + \ldots \quad (15.2) \quad (15)$$

Equation 15 can be substituted in Equation 2 to yield Equation 16 as follows:

$$I(x) = \Sigma_\omega \Sigma_{x_s} \Sigma_{x_r} G^*(x, x_s; \omega) P_D^{p*}(x_s, x_r; \omega) \quad (16.1)$$
$$G(x, x_r; \omega) P_U^p(x_s, x_r; \omega) +$$
$$\Sigma_\omega \Sigma_{x_s} \Sigma_{x_r} G^*(x, x_s; \omega) P_D^{m1*}(x_s, x_r; \omega) \quad (16.2)$$
$$G(x, x_r; \omega) P_U^p(x_s, x_r; \omega) + \ldots \quad (16)$$

Higher order multiples are not shown in Equation 16 for simplicity. However, at least one embodiment provides for prediction of all orders of anti-causal crosstalk noise (Image 10 in Table 1) using only one migration.

The causal and/or anti-causal crosstalk in the seismic image from multiples (Image 12 in Table 1) can be adaptively removed to create a crosstalk attenuated seismic image of multiples (Image 19 in Table 1). Crosstalk attenuated seismic images from primaries (Image 1 in Table 1) and from multiples (Image 19 in Table 1) can be combined to create a crosstalk attenuated seismic image from primaries and multiples (Image 20 in Table 1).

Figure 8:
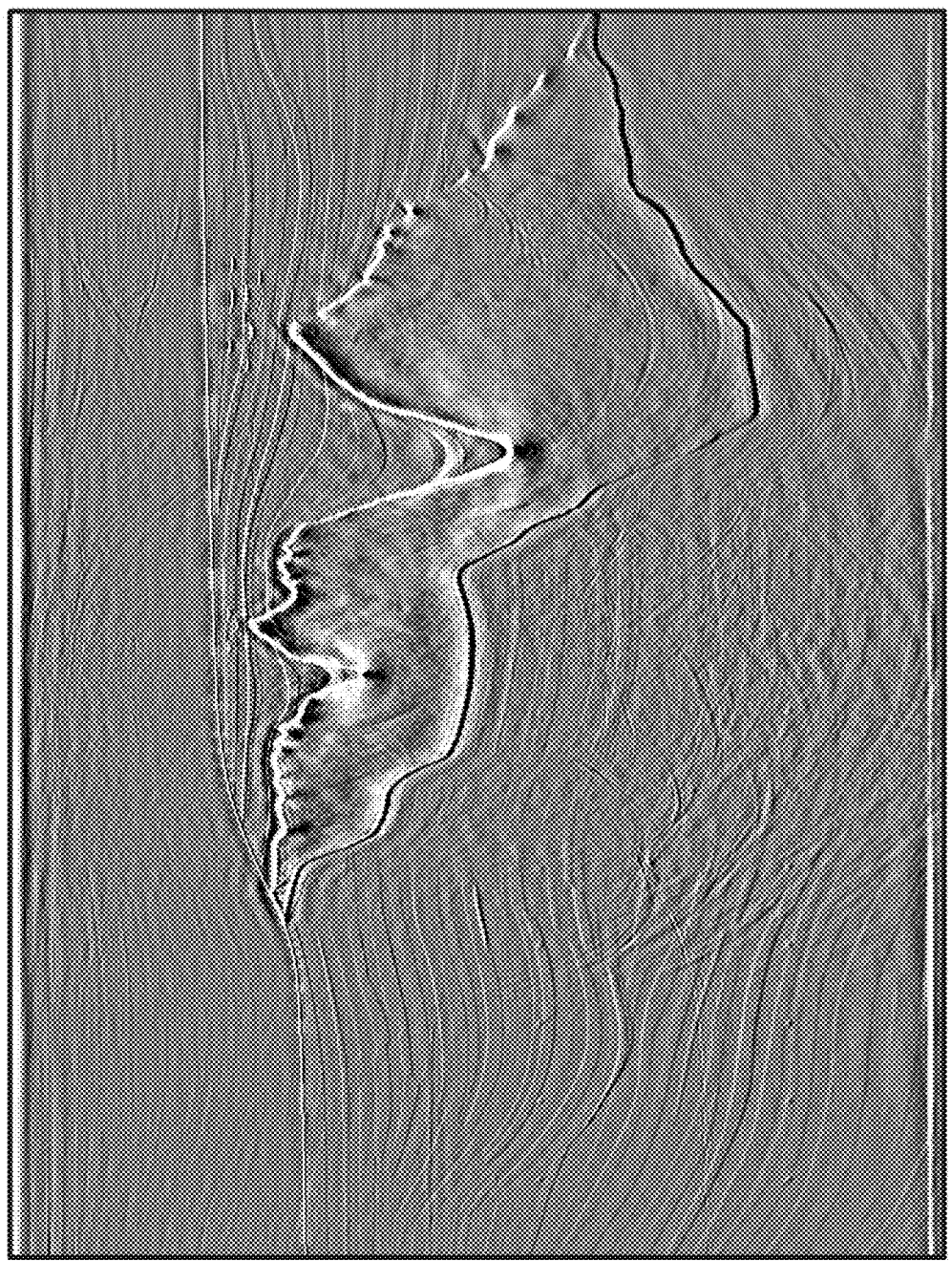
FIG. 8 illustrates a seismic image of multiples including an image of subsurface reflectors, causal crosstalk, and anti-causal crosstalk.

FIG. 8 illustrates a seismic image 860 of multiples including an image of subsurface reflectors, causal crosstalk, and anti-causal crosstalk. The seismic image 860 can also include an image of primaries. That is, the seismic image 860 can be a raw seismic image without processing to remove multiples or crosstalk.

Figure 9:
FIG. 9 illustrates a seismic image of a prediction of causal crosstalk.

FIG. 9 illustrates a seismic image 962 of a prediction of causal crosstalk. The prediction of causal crosstalk can be provided as described with respect to FIG. 4 and FIG. 6. The causal crosstalk that is predicted can be causal crosstalk that is part of the seismic image 860 illustrated in FIG. 8.

Figure 10:
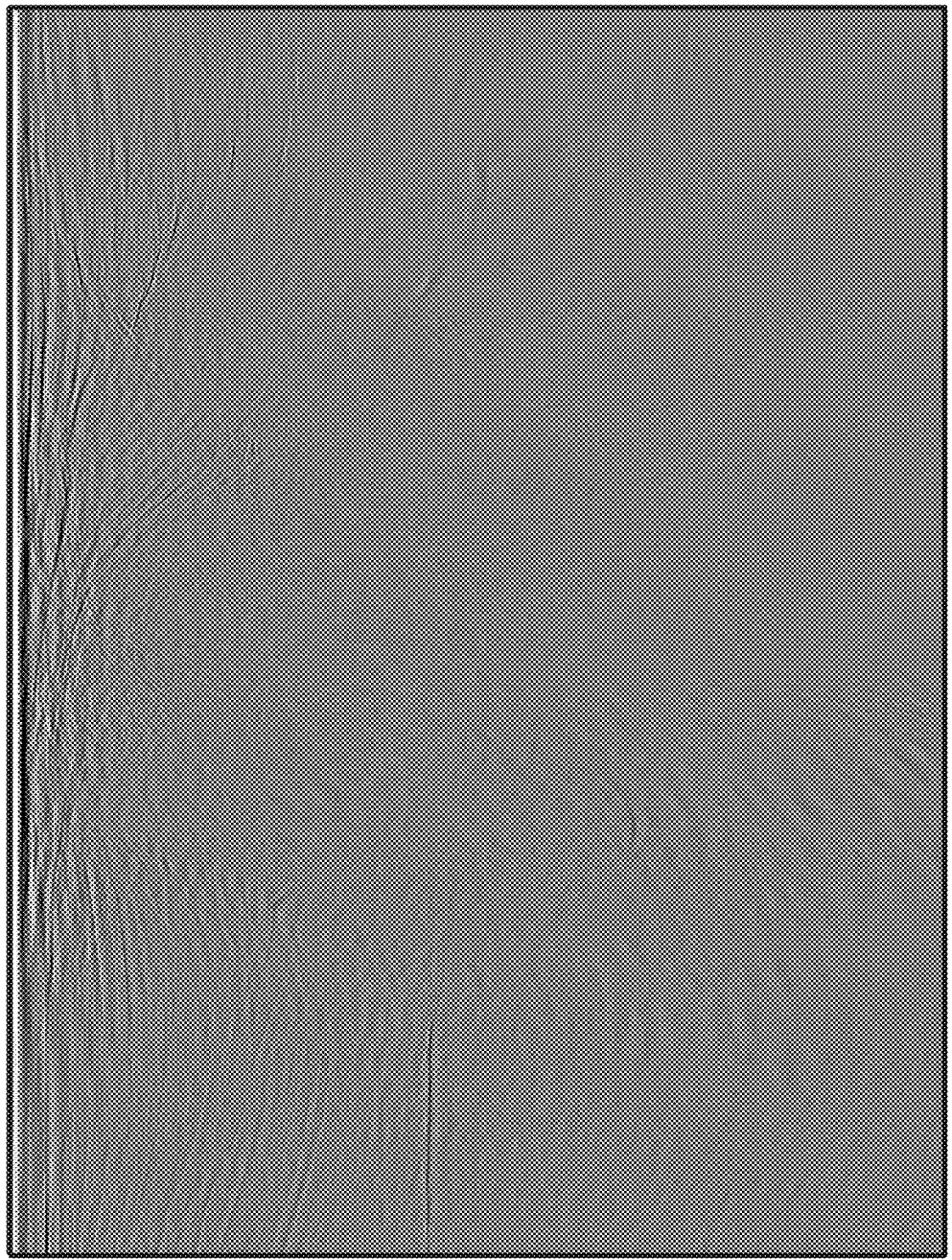
FIG. 10 illustrates a seismic image of a prediction of anti-causal crosstalk.

FIG. 10 illustrates a seismic image 1064 of a prediction of anti-causal crosstalk. The prediction of anti-causal crosstalk can be provided as described with respect to FIGS. 5 and 7. The anti-causal crosstalk that is predicted can be anti-causal crosstalk that is part of the seismic image 860 illustrated in FIG. 8.

Figure 11:
FIG. 11 illustrates a seismic image of multiples after crosstalk attenuation from the seismic image illustrated in FIG. 8.

FIG. 11 illustrates a seismic image 1166 of multiples after crosstalk attenuation from the seismic image 860 illustrated in FIG. 8. That is, the seismic image 1166 represents the seismic image 860 illustrated in FIG. 8 after the predicted causal crosstalk illustrated in the seismic image 962 illustrated in FIG. 9 and the anti-causal crosstalk illustrated in the seismic image 1064 in FIG. 10 have been attenuated (e.g., removed) therefrom. The seismic image 1166 can also include an image of primaries.

Figure 12:
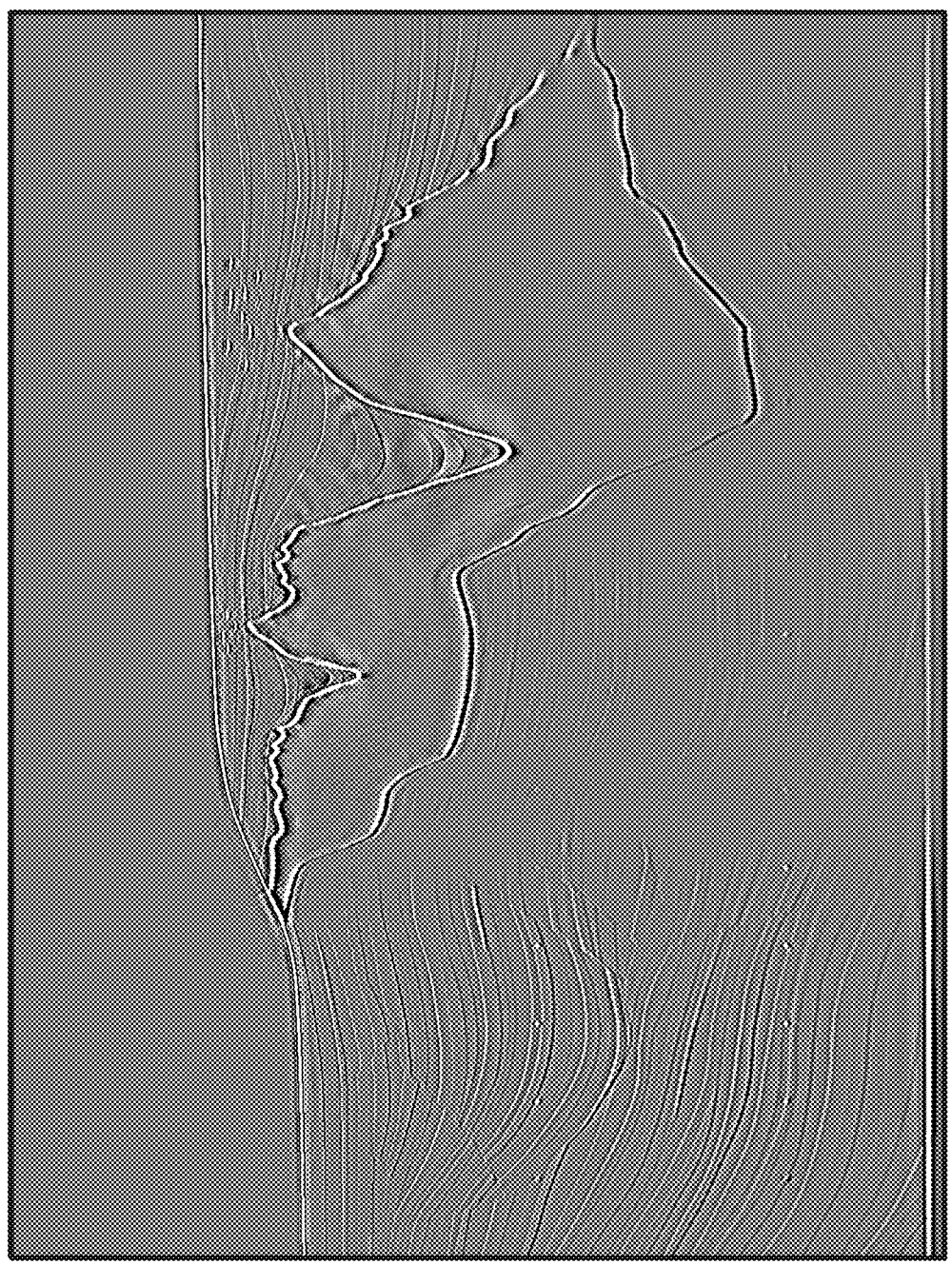
FIG. 12 illustrates a seismic image of primaries without crosstalk.

FIG. 12 illustrates a seismic image 1268 of primaries without crosstalk. The primaries, which are more easily discernable in the seismic image 1268 can be the same primaries that can be included in the seismic image 860 in FIG. 8 and the seismic image 1166 in FIG. 11.

Figure 13:
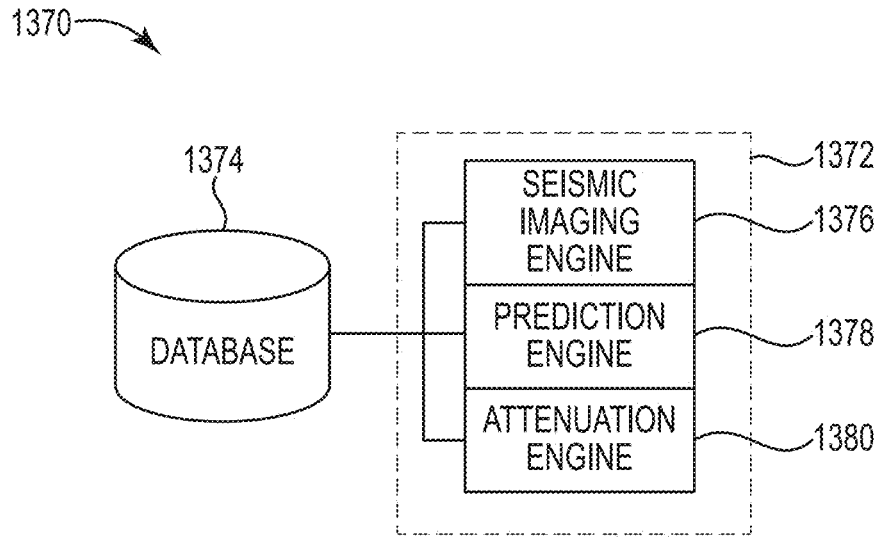
FIG. 13 illustrates a diagram of a system for crosstalk attenuation for seismic imaging.

FIG. 13 illustrates a diagram of a system 1370 for crosstalk attenuation for seismic imaging. The system 1370 can include a data store 1374, a subsystem 1372, and/or a number of engines (e.g., seismic imaging engine 1376, prediction engine 1378 and/or attenuation engine 1380) and can be in communication with the data store 1374 via a communication link. The system 1370 can include additional or fewer engines than illustrated to perform the various functions described herein. The system can represent program instructions and/or hardware of a machine (e.g., machine 1482 as referenced in FIG. 14, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The seismic imaging engine 1376 can include a combination of hardware and program instructions that is configured to create a seismic image based on seismic data including multiples. The seismic image can include causal crosstalk and anti-causal crosstalk. The seismic imaging engine 1376 can be configured to create a seismic image that includes causal crosstalk and anti-causal crosstalk by migration of down-going primaries and multiples as a source wavefield of the seismic data from a seismic source to a subsurface image point and by migration of up-going primaries and multiples as a receiver wavefield of the seismic data from a seismic receiver to the subsurface image point. The seismic imaging engine 1376 can be configured to create the seismic image by applying an imaging condition at a subsurface image point. The seismic imaging engine 1376 can be configured to apply one of the group of seismic imaging conditions including deconvolution and cross-correlation at the subsurface image point. The object of deconvolution is to reverse the effects of convolution on recorded data, where convolution assumes that the recorded data is a combination of a reflectivity function and a source wavefield from a point source. Cross-correlation is a measure of similarity between two wavefields as a function of a time lag applied to one of them.

The prediction engine 1378 can include a combination of hardware and program instructions that is configured to predict causal crosstalk based on the seismic data. The prediction engine 1378 can be configured to predict anti-causal crosstalk based on the seismic data. The prediction engine 1378 can be configured to predict the anti-causal crosstalk by migration of down-going multiples as a source wavefield of the seismic data from a seismic source to a subsurface image point and by migration of up-going primaries as a receiver wavefield of the seismic data from a seismic receiver to the subsurface image point. The prediction engine 1378 can be configured to extract the down-going multiples using down-going and up-going wavefield separation of the seismic data and to estimate the up-going primaries using surface related multiple elimination. The prediction engine 1378 can be configured to predict the causal crosstalk by migration of a down-going wavefield as a source wavefield of the seismic data from a seismic source modeled as a point source to a subsurface image point and migration of up-going multiples as a receiver wavefield of the seismic data from a seismic receiver to the subsurface image point. The prediction engine can include a combination of hardware and program instructions that is configured to predict the causal crosstalk by auto-convolution of a receiver wavefield of the seismic data that includes both primaries and multiples. Auto-convolution of a wavefield is a convolution of the wavefield with itself. The prediction engine 1378 can be configured to extract the source wavefield and the receiver wavefield using down-going and up-going wavefield separation of the seismic data.

The attenuation engine 1380 can include a combination of hardware and program instructions that is configured to attenuate the predicted causal crosstalk and the predicted anti-causal crosstalk from the seismic image. The seismic imaging engine 1376 can be configured to combine the causal crosstalk and anti-causal crosstalk attenuated seismic image of the multiples with a crosstalk attenuated seismic image of primaries to obtain a crosstalk attenuated seismic image of the primaries and the multiples.

Figure 14:
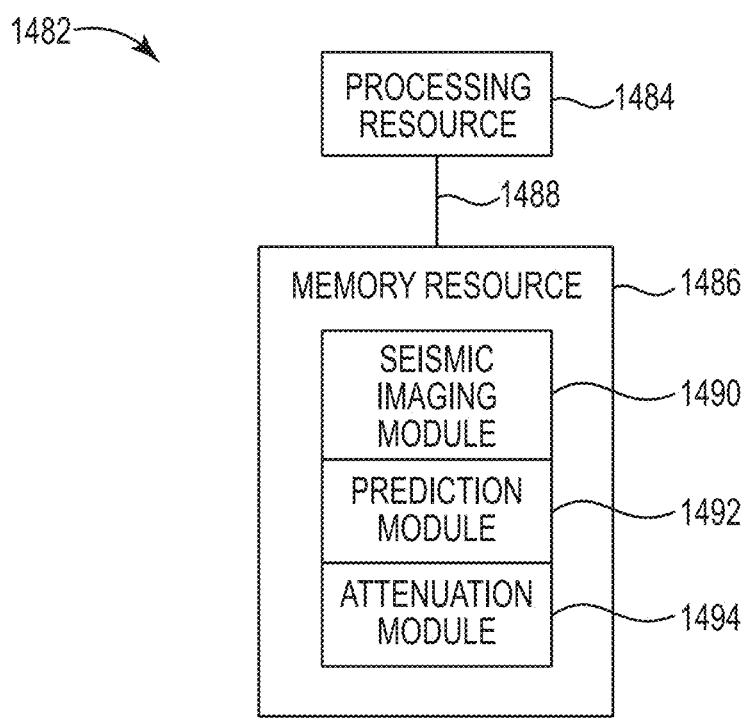
FIG. 14 illustrates a diagram of a machine for crosstalk attenuation for seismic imaging.

FIG. 14 illustrates a diagram of a machine for crosstalk attenuation for seismic imaging. The machine 1482 can utilize software, hardware, firmware, and/or logic to perform a number of functions. The machine 1482 can be a combination of hardware and program instructions configured to perform a number of functions (e.g., actions). The hardware, for example, can include a number of processing resources 1484 and a number of memory resources 1486, such as a machine-readable medium or other non-transitory memory resources 1486. The memory resources 1486 can be internal and/or external to the machine 1482, for example, the machine 1482 can include internal memory resources and have access to external memory resources. The program instructions, such as machine-readable instructions, can include instructions stored on the machine-readable medium to implement a particular function, for example, an action such as crosstalk attenuation for seismic imaging. The set of machine-readable instructions can be executable by one or more of the processing resources 1484. The memory resources 1486 can be coupled to the machine 1482 in a wired and/or wireless manner. For example, the memory resources 1486 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 1486 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 1484 can be coupled to the memory resources 1486 via a communication path 1488. The communication path 1488 can be local or remote to the machine 1482. Examples of a local communication path 1488 can include an electronic bus internal to a machine, where the memory resources 1486 are in communication with the processing resources 1484 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1488 can be such that the memory resources 1486 are remote from the processing resources 1484, such as in a network connection between the memory resources 1486 and the processing resources 1484. That is, the communication path 1488 can be a network connection. Examples of such a network connection can include a local area network, wide area network, personal area network, and the Internet, among others.

As shown in FIG. 14, the machine-readable instructions stored in the memory resources 1486 can be segmented into a number of modules 1490, 1492, 1494 that when executed by the processing resources 1484 can perform a number of functions. As used herein a module includes a set of instructions included to perform a particular task or action. The number of modules 1490, 1492, 1494 can be sub-modules of other modules. For example, the prediction module 1492 can be a sub-module of the seismic imaging module 1490 and/or the prediction module 1492 and the seismic imaging module 1490 can be contained within a single module. Furthermore, the number of modules 1490, 1492, 1494 can comprise individual modules separate and distinct from one another. Examples are not limited to the specific modules 1490, 1492, 1494 illustrated in FIG. 14.

Each of the number of modules 1490, 1492, 1494 can include program instructions and/or a combination of hardware and program instructions that, when executed by a processing resource 1484, can function as a corresponding engine as described with respect to FIG. 13. For example, the seismic imaging module 1490 can include program instructions and/or a combination of hardware and program instructions that, when executed by a processing resource 1484, can function as the seismic imaging engine 1376, the prediction module 1492 can include program instructions and/or a combination of hardware and program instructions that, when executed by a processing resource 1484, can function as the prediction engine 1378, and/or the attenuation module 1494 can include program instructions and/or a combination of hardware and program instructions that, when executed by a processing resource 1484, can function as the attenuation engine 1380.

The machine 1482 can include a seismic imaging module 1490, which can include instructions to create a first seismic image based on first seismic data that includes primaries. The seismic imaging module 1490 can include instructions to create a second seismic image based on second seismic data that includes multiples.

The machine 1482 can include a prediction module 1492, which can include instructions to predict first causal crosstalk based on the first seismic data and predict second causal crosstalk and anti-causal crosstalk based on the second seismic data. The prediction module 1492 can include instructions to predict multiples in the first seismic data. The prediction module 1492 can include instructions to use down-going primaries and multiples as a source wavefield of the first seismic data and use the first seismic data as a subsurface reflection property to estimate the multiples in the first seismic data. The multiples can be an up-going wavefield. The prediction module 1492 can include instructions to predict multiples in the first seismic data via surface related multiple elimination.

The machine 1482 can include an attenuation module 1494, which can include instructions to attenuate the first causal crosstalk from the first seismic image and to attenuate the second causal crosstalk and the anti-causal crosstalk from the second seismic image. The attenuation module 1494 can include instructions to attenuate multiples from the first seismic data based on the predicted multiples.

The machine 1482 can include a seismic imaging module 1490, which can include instructions to combine the causal crosstalk attenuated first seismic image with the causal crosstalk and anti-causal crosstalk attenuated second seismic image.

In accordance with at least one embodiment of the present disclosure, a geophysical data product may be produced. The geophysical data product may include, for example, a causal crosstalk and anti-causal crosstalk attenuated seismic image. Geophysical data including seismic data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, a seismic image can be created based on the seismic data including multiples, for example as it is being acquired or after it is acquired, offshore to facilitate other processing of the acquired seismic data either offshore or onshore. The seismic image can include causal crosstalk and anti-causal crosstalk. As another example, causal crosstalk and anti-causal crosstalk can be predicted based on the seismic data, for example as it is being acquired or after it is acquired, offshore to facilitate other processing of the acquired seismic data either offshore or onshore. As another example, the causal crosstalk and anti-causal crosstalk can be attenuated from the seismic image, for example as it is being acquired or after it is acquired, offshore to facilitate other processing of the acquired seismic data either offshore or onshore.

Figure 15:
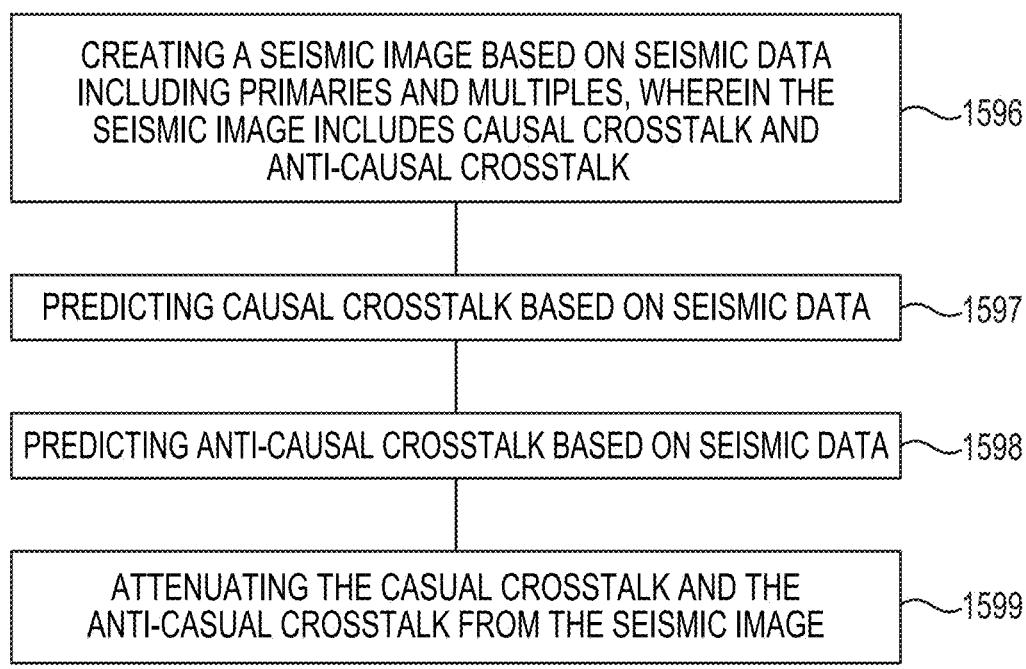
FIG. 15 illustrates a method flow diagram for crosstalk attenuation for seismic imaging.

FIG. 15 illustrates a method flow diagram for crosstalk attenuation for seismic imaging. At block 1596, the method can include creating a seismic image based on seismic data including primaries and multiples. The seismic image can include causal crosstalk and anti-causal crosstalk. Creating the seismic image can include migrating down-going primaries and multiples as a source wavefield from a seismic source modeled as a point source to a subsurface image point and migrating up-going primaries and multiples as a receiver wavefield from a seismic receiver to the subsurface image point. Creating the seismic image of the primaries and the multiples can include applying one of the group of seismic imaging conditions including deconvolution and cross-correlation at the subsurface image point. The source wavefield and the receiver wavefield can be extracted from down-going and up-going wavefield separation of the seismic data.

At block 1597, the method can include predicting causal crosstalk based on the seismic data. Predicting causal crosstalk can include migrating a down-going wavefield as a source wavefield of the seismic data from a seismic source modeled as a point source to a subsurface image point and migrating up-going multiples as a receiver wavefield of the seismic data from a seismic receiver to the subsurface image point.

At block 1598, the method can include predicting anti-causal crosstalk based on the seismic data. Predicting anti-causal crosstalk can include migrating down-going primaries and multiples as a source wavefield of the seismic data from a seismic source to a subsurface image point and migrating up-going primaries as a receiver wavefield of the seismic data from a seismic receiver to the subsurface image point.

At block 1599, the method can include attenuating the predicted causal crosstalk and the predicted anti-causal crosstalk from the seismic data.

The method can include joint seismic imaging of primaries of all orders of recorded multiples, causal crosstalk prediction, anti-causal crosstalk prediction, and both causal crosstalk and anti-causal crosstalk attenuation. Primaries and multiples can be jointly imaged by using a down-going wavefield, including primaries and multiples (Source E in Table 1), as a source wavefield from a point source, and an up-going wavefield including primaries and multiples (Receiver C) as a receiver wavefield. A seismic image from joint migration of primaries and multiples (Image 15 in Table 1) can be contaminated by causal and/or anti-causal crosstalk. The migration input up-going and down-going wavefields can be decomposed as represented by Equation 17 as follows:

$$P_U = P_U^p + P_U^{m1} + P_U^{m2} \quad (17.1)$$
$$P_D = P_D^1 + P_D^p + P_D^{m1} \quad (17.2)$$
(17)

Equation 17 can be substituted in Equation 2 to yield Equation 18 as follows:

$$\begin{aligned}
I(x) = \Sigma_\omega \Sigma_{x_s} \Sigma_{x_r} & G^*(x, x_s; \omega) P_D^{1*}(x_s, x_r; \omega) & (18.1) \\
& G(x, x_r; \omega) P_U^p(x_s, x_r; \omega) + & \\
\Sigma_\omega \Sigma_{x_s} \Sigma_{x_r} & G^*(x, x_s; \omega) P_D^{p*}(x_s, x_r; \omega) & (18.2) \\
& G(x, x_r; \omega) P_U^{m1}(x_s, x_r; \omega) + & \\
\Sigma_\omega \Sigma_{x_s} \Sigma_{x_r} & G^*(x, x_s; \omega) P_D^{m1*}(x_s, x_r; \omega) & (18.3) \\
& G(x, x_r; \omega) P_U^{m2}(x_s, x_r; \omega) + \dots + & \\
\Sigma_\omega \Sigma_{x_s} \Sigma_{x_r} & G^*(x, x_s; \omega) P_D^{1*}(x_s, x_r; \omega) & (18.4) \\
& G(x, x_r; \omega) P_U^{m1}(x_s, x_r; \omega) + & \\
\Sigma_\omega \Sigma_{x_s} \Sigma_{x_r} & G^*(x, x_s; \omega) P_D^{1*}(x_s, x_r; \omega) & (18.5) \\
& G(x, x_r; \omega) P_U^{m2}(x_s, x_r; \omega) + & \\
\Sigma_\omega \Sigma_{x_s} \Sigma_{x_r} & G^*(x, x_s; \omega) P_D^{p*}(x_s, x_r; \omega) & (18.6) \\
& G(x, x_r; \omega) P_U^{m2}(x_s, x_r; \omega) + \dots + & \\
\Sigma_\omega \Sigma_{x_s} \Sigma_{x_r} & G^*(x, x_s; \omega) P_D^{p*}(x_s, x_r; \omega) & (18.7) \\
& G(x, x_r; \omega) P_U^p(x_s, x_r; \omega) + & \\
\Sigma_\omega \Sigma_{x_s} \Sigma_{x_r} & G^*(x, x_s; \omega) P_D^{m1}(x_s, x_r; \omega) & (18.8) \\
& G(x, x_r; \omega) P_U^p(x_s, x_r; \omega) + & \\
\Sigma_\omega \Sigma_{x_s} \Sigma_{x_r} & G^*(x, x_s; \omega) P_D^{m1}(x_s, x_r; \omega) & (18.9) \\
& G(x, x_r; \omega) P_U^p(x_s, x_r; \omega) + \dots &
\end{aligned}$$
(18)

where Equation 18.1 represents a seismic image of primaries, and Equations 18.2 and 18.3 represent seismic images of multiples. Equations 18.4-18.6 represent various orders of causal crosstalk, and Equations 18.7-18.9 represent various orders of anti-causal crosstalk.

Different sources of crosstalk present in the seismic image (Image 15 in Table 1) can be identified using Equation 18. Joint migration with primaries and multiples can be simplified since Equation 18 includes only one order of multiples in the source wavefield and two orders of multiples in the receiver wavefield. In Equation 18, the primaries and multiples can be included in a joint expression. When a direct arrival is not present, a point source can be scaled to make a seismic image of the primaries match a seismic image of the multiples. Different crosstalk terms can be predicted in the seismic image space so that the different crosstalk terms can be adaptively attenuated.

At least one embodiment of the present disclosure includes a seismic imaging method. For example, a first method can include seismic imaging of multiples with both causal crosstalk and anti-causal crosstalk, causal crosstalk prediction, anti-causal crosstalk prediction, and both causal crosstalk and anti-causal crosstalk attenuation. A second method can include joint seismic imaging of primaries and multiples, causal crosstalk prediction, and both causal crosstalk and anti-causal crosstalk attenuation. A third method can include seismic imaging of primaries with causal crosstalk, causal crosstalk prediction, causal crosstalk attenuation, and a combination of crosstalk-free seismic image of primaries with a crosstalk-free seismic image of multiples (e.g. from the first method). Embodiments are not constrained to a seismic imaging method, however, and one-way wave equation migration and/or two-way reverse time migration wave equation migration can be used. At least one embodiment can be applied in a post-stack image domain and/or a pre-stack image domain (e.g., subsurface offset and/or angle gathers).

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a seismic imaging engine, comprising hardware, configured to create a seismic image based on seismic data, wherein the seismic data includes multiples, wherein the seismic image includes causal crosstalk and anti-causal crosstalk, and wherein the seismic image is indicative of a subterranean formation;
    a prediction engine, comprising hardware, configured to:
        predict causal crosstalk based on the seismic data by:
            migration of down-going multiples to a subsurface image point as a source wavefield of the seismic data; and
            migration of up-going primaries to the subsurface image point as a receiver wavefield of the seismic data; and
        predict anti-causal crosstalk based on the seismic data by:
            migration of a down-going wavefield to a subsurface image point as a source wavefield of the seismic data; and
            migration of up-going multiples to the subsurface image point as a receiver wavefield of the seismic data;
    an attenuation engine, comprising hardware, configured to attenuate the predicted causal crosstalk and the predicted anti-causal crosstalk from the seismic image; and
    a tangible machine-readable medium storing the seismic image having the predicted causal crosstalk and the predicted anti-causal crosstalk attenuated therefrom such that the seismic image is better indicative of the subterranean formation.

2. The system of claim 1, wherein the prediction engine is configured to:
    extract the down-going multiples using down-going and up-going wavefield separation of the seismic data; and
    estimate the up-going primaries using surface related multiple elimination.

3. The system of claim 1, wherein the seismic imaging engine is configured to create the seismic image by applying a seismic imaging condition at the subsurface image point.

4. The system of claim 1, wherein the seismic imaging engine is configured to combine the causal crosstalk and anti-causal crosstalk attenuated seismic image of the multiples with a crosstalk attenuated seismic image of primaries to obtain a crosstalk attenuated seismic image of the primaries and the multiples.

5. The system of claim 1, wherein the seismic imaging engine is configured to create the seismic image by:
    migration of down-going primaries and multiples to a subsurface image point as a source wavefield of the seismic data; and
    migration of up-going primaries and multiples to the subsurface image point as a receiver wavefield of the seismic data.

6. The system of claim 5, wherein the seismic imaging engine is configured to apply one of the group of seismic imaging conditions including deconvolution and cross-correlation at the subsurface image point.

7. The system of claim 5, wherein the seismic imaging engine is configured to extract the source wavefield and the receiver wavefield using down-going and up-going wavefield separation of the seismic data.

8. A method, comprising:
    creating a seismic image based on seismic data including primaries and multiples, wherein the seismic image includes causal crosstalk and anti-causal crosstalk and wherein the seismic image is indicative of a subterranean formation;
    predicting causal crosstalk based on the seismic data by:
        migrating down-going primaries and multiples to a subsurface image point as a source wavefield of the seismic data; and
        migrating up-going primaries to the subsurface image point as a receiver wavefield of the seismic data;
    predicting anti-causal crosstalk based on the seismic data by:
        migrating a down-going wavefield as a source wavefield of the seismic data from a seismic source modeled as a point source to a subsurface image point; and
        migrating up-going multiples as a receiver wavefield of the seismic data from a seismic receiver to the subsurface image point;
    attenuating the predicted causal crosstalk and the predicted anti-causal crosstalk from the seismic image; and
    storing the seismic image having the predicted causal crosstalk and the predicted anti-causal crosstalk attenuated therefrom in a tangible machine-readable medium such that the seismic image is better indicative of the subterranean formation.

9. The method of claim 8, wherein creating the seismic image comprises:
    migrating down-going primaries and multiples to a subsurface image point as a source wavefield of the seismic data; and
    migrating up-going primaries and multiples to the subsurface image point as a receiver wavefield of the seismic data.

10. The method of claim 9, wherein creating the seismic image of the primaries and the multiples comprises applying one of the group of seismic imaging conditions including deconvolution and cross-correlation at the subsurface image point.

11. The method of claim 9 including extracting the source wavefield and the receiver wavefield from down-going and up-going wavefield separation of the seismic data.

12. A non-transitory machine-readable medium storing instructions executable by a processing resource to:
create a first seismic image based on first seismic data that includes primaries;
create a second seismic image based on second seismic data that includes multiples;
wherein the first seismic image and the second seismic image are indicative of a subterranean formation;
predict first causal crosstalk based on first seismic data;
predict second causal crosstalk and anti-causal crosstalk based on second seismic data;
attenuate the first causal crosstalk from the first seismic image;
attenuate the second causal crosstalk and the anti-causal crosstalk from the second seismic image;
combine the causal crosstalk attenuated first seismic image with the causal crosstalk and anti-causal crosstalk attenuated second seismic image to create a resulting seismic image; and
store the resulting seismic image that is better indicative of the subterranean formation.

13. The medium of claim 12, including instructions to:
predict multiples in the first seismic data; and
attenuate multiples from the first seismic data based on the predicted multiples.

14. The medium of claim 13, including instructions to use down-going primaries and multiples as a source wavefield of the first seismic data and use the first seismic data as a subsurface reflection property to estimate the multiples in the first seismic data, wherein the multiples comprise up-going multiples.

15. The medium of claim 13, including instructions to estimate the multiples in the first seismic data via surface related multiple elimination.

16. A method of generating a geophysical data product, the method comprising:
obtaining geophysical data including seismic data;
creating a seismic image based on the seismic data including multiples, wherein the seismic image includes causal crosstalk and anti-causal crosstalk and wherein the seismic image is indicative of a subterranean formation;
predicting causal crosstalk based on the seismic data by:
migration of down-going multiples to a subsurface image point as a source wavefield of the seismic data; and
migration of up-going primaries to the subsurface image point as a receiver wavefield of the seismic data;
predicting anti-causal crosstalk based on the seismic data by:
migration of a down-going wavefield to a subsurface image point as a source wavefield of the seismic data; and
migration of up-going multiples to the subsurface image point as a receiver wavefield of the seismic data;
attenuating the predicted causal crosstalk and the predicted anti-causal crosstalk from the seismic image such that the seismic image is better indicative of the subterranean formation; and
recording the attenuated seismic image on a non-transitory machine-readable medium, thereby generating the geophysical data product.

\* \* \* \* \*

UNITED STATES PATENT AND TRADEMARK OFFICE
CERTIFICATE OF CORRECTION

PATENT NO. : 10,401,517 B2
APPLICATION NO. : 14/991416
DATED : September 3, 2019
INVENTOR(S) : Shaoping Lu et al.

Page 1 of 1

It is certified that error appears in the above-identified patent and that said Letters Patent is hereby corrected as shown below:

In the Claims

In Claim 1, at Column 21, Line 35, "causal" should read "anti-causal".

In Claim 1, at Column 21, Line 42, "anti-causal" should read "causal".

In Claim 8 at Column 22, Line 29, "causal" should read "anti-causal".

In Claim 8 at Column 22, Line 35, "anti-causal" should read "causal".

In Claim 16 at Column 24, Line 9, "causal" should read "anti-causal".

In Claim 16 at Column 24, Line 17, "anti-causal" should read "causal".

Signed and Sealed this
Tenth Day of March, 2020

Andrei Iancu
*Director of the United States Patent and Trademark Office*